United States Patent [19]

Melnikoff

[11] Patent Number: 5,729,700

[45] Date of Patent: Mar. 17, 1998

[54] METHODS AND APPARATUS FOR FACILITATING EXECUTION OF ASSET TRADES BASED ON NONNEGATIVE INVESTMENT RISK, USING OVERLAPPING TIME PERIODS

[75] Inventor: Meyer Melnikoff, 1 Claridge Dr., Apt. 507, Verona, N.J. 07044

[73] Assignee: Meyer Melnikoff, Verona, N.J.

[21] Appl. No.: 393,910

[22] Filed: Feb. 24, 1995

[51] Int. Cl.$^6$ ........................................... G06F 17/60
[52] U.S. Cl. ........................................ 395/236; 395/237
[58] Field of Search ................................ 395/235, 236, 395/237

[56] References Cited

U.S. PATENT DOCUMENTS 5,126,936  6/1992  Champion et al. ............... 364/408

OTHER PUBLICATIONS

W.F. Sharpe, et al., *Investments*, Prentice–Hall (1995) (excerpted pp. 178–179).
H.H. Markowitz, "Portfolio Selection," *The Journal of Finance*, VII, 77 (1952).
H.H. Markowitz, "The Optimization of a Quadratic Function Subject to Linear Constraints," *Naval Research Logistics Quarterly*, vol. 3, 111–133 (Mar. and Jun., 1956).
H.H. Markowitz, *Portfolio Selection, Efficient Diversification of Investments*, John Wiley & Sons, Inc. (1959) (excerpted pp. 3–7, 14–26, 49–53, 76–77, 188–201, 286–297.

Morningstar, Inc., *User's Guide to Morningstar Mutual Funds* (1994) (excerpted pp. 11–12, 13–16, 22–24, 41–43).
Morningstar, Inc., 22 *Morningstar Mutual Funds*, Section 1 (Apr. 29, 1994) (excerpted pp. 1–2).
Securities and Exchange Commission, "Improving Descriptions of Risk by Mutual Funds and Other Investment Companies; Proposed Rule", 60 Fed.Reg. 17172 (Apr. 4, 1995).
W.F. Sharpe, "A Simplified Model for Portfolio Analysis," *Management Science*, IX, 277 (1963).
W.F. Sharpe, "Capital Asset Prices: A Theory of Market Equilibrium Under Conditions of Risk," *The Journal of Finance*, XIX, 423 (1964).
T. Monk et al., Program Offers Portfolio Management Basics, pp.: 21–22, Aug. 1989.

Primary Examiner—Tommy P. Chin
Assistant Examiner—David R. Vincent
Attorney, Agent, or Firm—Fish & Neave; Jeffrey H. Ingerman; Avinash S. Lele

[57] ABSTRACT

A portfolio selector for selecting an investment portfolio from a library of assets based on investment risk and risk-adjusted return is provided. The selector chooses a tentative portfolio from the library and determines a risk-adjusted return for the portfolio. The risk-adjusted return is computed by subtracting the average of multiple segment shortfalls from the average of multiple segment performances, over the same segments, based on analysis of market value data for the assets in the portfolio and for a baseline asset. The asset selection and computation is repeated until the risk-adjusted return of the portfolio satisfies criteria derived from preference data specific to an investor.

55 Claims, 32 Drawing Sheets

Fig. 2
INDEX OF FUND ACCUMULATED VALUE

| Month* 220 | Fund 1 (Fidelity Magellan) 230 | Fund 2 (Mathers) 240 | Fund 3 (AIM Constellation) 250 |
|---|---|---|---|
| Jun 83 | 100.00000 | 100.00000 | 100.00000 |
| Jul 83 | 96.52956 | 98.10637 | 91.22024 |
| Aug 83 | 94.37018 | 98.87188 | 86.60714 |
| Sep 83 | 97.53213 | 98.63014 | 89.62054 |
| Oct 83 | 93.29049 | 94.84287 | 77.23214 |
| Nov 83 | 97.48072 | 98.67043 | 84.41220 |
| Dec 83 | 95.96401 | 96.97824 | 79.98512 |
| . | . | . | . |
| . | . | . | . |
| . | . | . | . |
| Jan 93 | 427.97752 | 271.94213 | 357.95976 |
| Feb 93 | 436.91164 | 267.40067 | 336.27230 |
| Mar 93 | 452.92688 | 270.85218 | 350.96380 |
| Apr 93 | 457.36085 | 272.85042 | 338.37108 |
| May 93 | 475.38749 | 276.66524 | 363.78972 |
| Jun 93 | 482.01695 | 274.84865 | 369.61969 |

* i.e. The close of the market on the last day on which the Stock Exchanges were open in the month.

Fig. 3
INDEX OF TARGET RATE ACCUMULATED VALUE
(3-Month Treasury Bills)

| Month*  220 | 330 |
|---|---|
| Jun 83 | 100.00000 |
| Jul 83 | 100.49000 |
| Aug 83 | 100.95225 |
| Sep 83 | 101.38625 |
| Oct 83 | 101.82231 |
| Nov 83 | 102.28051 |
| Dec 83 | 102.75100 |
| . | . |
| . | . |
| . | . |
| . | . |
| . | . |
| . | . |
| Jan 93 | 148.66637 |
| Feb 93 | 149.02317 |
| Mar 93 | 149.39573 |
| Apr 93 | 149.75428 |
| May 93 | 150.12866 |
| Jun 93 | 150.51900 |

* i.e. The close of the market on the last day on which the Stock Exchanges were open in the month.

*Fig. 6A*

MEASURING INVESTMENT RISK (SHORTFALL) AND RISK-ADJUSTED RETURN

ONE MONTH HOLDING PERIOD - FIDELITY MAGELLAN FUND (3% Sales Load)

| (1) | (2) | (3) | (4) | (5) | (6) | (7) | (8) | (9) | (10) |
|---|---|---|---|---|---|---|---|---|---|
| | | | 3 Month T-Bill Value Index | T-Bill 1 Month Change % | Fund Value Index | Fund 1 Month Change % | Fund Monthly Shortfall = (5)-(7) if Positive % | Load Adjusted Fund 1 Month Change % | Load Adjusted Monthly Fund Shortfall =(5)-(9) if Positive -% |
| Item # | Observ. # | Month* | | | | | | | |
| 0 | | Jun 83 | 100.00000 | | 100.00000 | | | | |
| 1 | | Jul 83 | 100.76000 | | 96.52956 | | | | |
| 2 | | Aug 83 | 101.54593 | | 94.37018 | | | | |
| 3 | | Sep 83 | 102.30752 | | 97.53213 | | | | |
| 4 | | Oct 83 | 103.04414 | | 93.29049 | | | | |
| 5 | | Nov 83 | 103.79636 | | 97.48072 | | | | |
| 6 | | Dec 83 | 104.57483 | | 95.96401 | | | | |
| 7 | | Jan 84 | 105.34869 | | 95.08997 | | | | |

* i.e. The close of the market on the last day on which the Stock Exchanges were open in the month.

*Fig. 6B*

| (1) | (2) | (3) | (4) | (5) | (6) | (7) | (8) | (9) | (10) |
|---|---|---|---|---|---|---|---|---|---|
| 8 | | Feb 84 | 106.14934 | | 88.92031 | | | | |
| 9 | | Mar 84 | 106.98792 | | 90.51414 | | | | |
| 10 | | Apr 84 | 107.85452 | | 89.79434 | | | | |
| 11 | | May 84 | 108.73892 | | 83.66897 | | | | |
| 12 | | Jun 84 | 109.63058 | | 86.37172 | | | | |
| 13 | | Jul 84 | 110.55148 | | 85.00581 | | | | |
| 14 | | Aug 84 | 111.51328 | | 94.91589 | | | | |
| 15 | | Sep 84 | 112.47229 | | 95.09026 | | | | |
| 16 | | Oct 84 | 113.38332 | | 96.31086 | | | | |
| 17 | | Nov 84 | 114.19968 | | 95.14839 | | | | |
| 18 | | Dec 84 | 114.96482 | | 97.90926 | | | | |
| 19 | | Jan 85 | 115.71209 | | 107.81934 | | | | |
| 20 | | Feb 85 | 116.51050 | | 108.57495 | | | | |
| 21 | | Mar 85 | 117.33772 | | 109.53399 | | | | |
| 22 | | Apr 85 | 118.11215 | | 110.11522 | | | | |
| 23 | | May 85 | 118.84445 | | 116.06846 | | | | |
| 24 | | Jun 85 | 119.53375 | | 119.53967 | | | | |
| 25 | | Jul 85 | 120.23900 | | 120.43346 | | | | |
| 26 | | Aug 85 | 120.94841 | | 121.02733 | | | | |
| 27 | | Sep 85 | 121.66200 | | 115.35562 | | | | |
| 28 | | Oct 85 | 122.39197 | | 122.82492 | | | | |
| 29 | | Nov 85 | 123.12633 | | 133.20754 | | | | |

*Fig. 6C*

| (1) | (2) | (3) | (4) | (5) | (6) | (7) | (8) | (9) | (10) |
|---|---|---|---|---|---|---|---|---|---|
| 30 |   | Dec 85 | 123.85277 |   | 140.11896 |   |   |   |   |
| 31 | 0 | Jan 86 | 124.58350 |   | 145.63570 |   |   |   |   |
| 32 | 1 | Feb 86 | 125.31854 |   | 160.69826 |   |   |   |   |
| 33 | 2 | Mar 86 | 126.00780 |   | 171.51478 |   |   |   |   |
| 34 | 3 | Apr 86 | 126.63784 |   | 172.28961 |   |   |   |   |
| 35 | 4 | May 86 | 127.28369 |   | 177.95169 |   |   |   |   |
| 36 | 5 | Jun 86 | 127.94556 |   | 182.19344 |   |   |   |   |
| 37 | 6 | Jul 86 | 128.57250 | 0.49 | 170.04048 | -6.67 | 7.16 | -9.47 | 9.96 |
| 38 | 7 | Aug 86 | 129.16393 | 0.46 | 180.98151 | 6.43 | 0.00 | 3.24 | 0.00 |
| 39 | 8 | Sep 86 | 129.71934 | 0.43 | 165.59674 | -8.50 | 8.93 | -11.25 | 11.68 |
| 40 | 9 | Oct 86 | 130.27713 | 0.43 | 174.24857 | 5.22 | 0.00 | 2.07 | 0.00 |
| 41 | 10 | Nov 86 | 130.86338 | 0.45 | 175.99914 | 1.00 | 0.00 | -2.03 | 2.48 |
| 42 | 11 | Dec 86 | 131.46535 | 0.46 | 173.38923 | -1.48 | 1.94 | -4.44 | 4.90 |
| 43 | 12 | Jan 87 | 132.05694 | 0.45 | 195.93090 | 13.00 | 0.00 | 9.61 | 0.00 |
| 44 | 13 | Feb 87 | 132.67761 | 0.47 | 210.46013 | 7.42 | 0.00 | 4.19 | 0.00 |
| 45 | 14 | Mar 87 | 133.30119 | 0.47 | 213.13094 | 1.27 | 0.00 | -1.77 | 2.24 |
| 46 | 15 | Apr 87 | 133.92771 | 0.47 | 209.49864 | -1.70 | 2.17 | -4.65 | 5.12 |
| 47 |   | May 87 | 134.55717 | 0.47 | 209.92607 | 0.20 | 0.27 | -2.80 | 3.27 |
| 48 |   | Jun 87 | 135.18959 | 0.47 | 218.61651 | 4.14 | 0.00 | 1.02 | 0.00 |
| 49 |   | Jul 87 | 135.82498 | 0.47 | 229.30018 | 4.89 | 0.00 | 1.74 | 0.00 |
| 50 |   | Aug 87 | 136.50410 | 0.50 | 238.50886 | 4.02 | 0.00 | 0.90 | 0.00 |
| 51 |   | Sep 87 | 137.22758 | 0.53 | 232.64879 | -2.46 | 2.99 | -5.38 | 5.91 |

Fig. 6D

| (1) | (2) | (3) | (4) | (5) | (6) | (7) | (8) | (9) | (10) |
|---|---|---|---|---|---|---|---|---|---|
| 52 | 16 | Oct 87 | 137.92744 | 0.51 | 172.61297 | -25.81 | 26.32 | -28.03 | 28.54 |
| 53 | 17 | Nov 87 | 138.57570 | 0.47 | 159.57730 | -7.55 | 8.02 | -10.33 | 10.80 |
| 54 | 18 | Dec 87 | 139.24086 | 0.48 | 175.12402 | 9.74 | 0.00 | 6.45 | 0.00 |
| 55 | 19 | Jan 88 | 139.90922 | 0.48 | 182.06784 | 3.97 | 0.00 | 0.85 | 0.00 |
| 56 | 20 | Feb 88 | 140.56679 | 0.47 | 193.11681 | 6.07 | 0.00 | 2.89 | 0.00 |
| 57 | 21 | Mar 88 | 141.22745 | 0.47 | 192.59274 | -0.27 | 0.74 | -3.26 | 3.73 |
| 58 | 22 | Apr 88 | 141.91947 | 0.49 | 196.04282 | 1.79 | 0.00 | -1.26 | 1.75 |
| 59 | 23 | May 88 | 142.65745 | 0.52 | 195.51876 | -0.27 | 0.79 | -3.26 | 3.78 |
| 60 | 24 | Jun 88 | 143.42780 | 0.54 | 208.88234 | 6.83 | 0.00 | 3.63 | 0.00 |
| 61 | 25 | Jul 88 | 144.23099 | 0.56 | 207.52851 | -0.65 | 1.21 | -3.63 | 4.19 |
| 62 | 26 | Aug 88 | 145.08196 | 0.59 | 200.93406 | -3.18 | 3.77 | -6.08 | 6.67 |
| 63 | 27 | Sep 88 | 145.95245 | 0.60 | 209.36273 | 4.19 | 0.00 | 1.07 | 0.00 |
| 64 | 28 | Oct 88 | 146.84276 | 0.61 | 213.72991 | 2.09 | 0.00 | -0.98 | 1.59 |
| 65 | 29 | Nov 88 | 147.79724 | 0.65 | 210.84757 | -1.35 | 2.00 | -4.31 | 4.96 |
| 66 | 30 | Dec 88 | 148.78748 | 0.67 | 214.99050 | 1.96 | 0.00 | -1.09 | 1.76 |
| 67 | 31 | Jan 89 | 149.81411 | 0.69 | 232.43178 | 8.11 | 0.00 | 4.87 | 0.00 |
| 68 | 32 | Feb 89 | 150.87779 | 0.71 | 228.64987 | -1.63 | 2.34 | -4.58 | 5.29 |
| 69 | 33 | Mar 89 | 151.97920 | 0.73 | 235.45731 | 2.98 | 0.00 | -0.11 | 0.84 |
| 70 | 34 | Apr 89 | 153.07345 | 0.72 | 247.29246 | 5.03 | 0.00 | 1.88 | 0.00 |
| 71 | 35 | May 89 | 154.14496 | 0.70 | 260.34873 | 5.28 | 0.00 | 2.12 | 0.00 |
| 72 | 36 | Jun 89 | 155.19315 | 0.68 | 258.08994 | -0.87 | 1.55 | -3.84 | 4.52 |
| 73 | 37 | Jul 89 | 156.21742 | 0.66 | 279.77437 | 8.40 | 0.00 | 5.15 | 0.00 |

*Fig. 6E*

| (1) | (2) | (3) | (4) | (5) | (6) | (7) | (8) | (9) | (10) |
|---|---|---|---|---|---|---|---|---|---|
| 74 | 38 | Aug 89 | 157.24846 | 0.66 | 287.09287 | 2.62 | 0.00 | -0.46 | 1.12 |
| 75 | 39 | Sep 89 | 158.27057 | 0.65 | 292.06222 | 1.73 | 0.00 | -1.32 | 1.97 |
| 76 | 40 | Oct 89 | 159.28351 | 0.64 | 282.89151 | -3.14 | 3.78 | -6.05 | 6.69 |
| 77 | 41 | Nov 89 | 160.30292 | 0.64 | 287.54463 | 1.64 | 0.00 | -1.40 | 2.04 |
| 78 | 42 | Dec 89 | 161.32886 | 0.64 | 289.34370 | 0.63 | 0.01 | -2.39 | 3.03 |
| 79 | 43 | Jan 90 | 162.36136 | 0.64 | 270.68261 | -6.45 | 7.09 | -9.26 | 9.90 |
| 80 | 44 | Feb 90 | 163.40048 | 0.64 | 276.24226 | 2.05 | 0.00 | -1.01 | 1.65 |
| 81 | 45 | Mar 90 | 164.47892 | 0.66 | 283.30060 | 2.56 | 0.00 | -0.52 | 1.18 |
| 82 | 46 | Apr 90 | 165.54803 | 0.65 | 276.14557 | -2.53 | 3.18 | -5.45 | 6.10 |
| 83 | 47 | May 90 | 166.60754 | 0.64 | 300.70675 | 8.89 | 0.00 | 5.63 | 0.00 |
| 84 | 48 | Jun 90 | 167.67383 | 0.64 | 302.01374 | 0.43 | 0.21 | -2.58 | 3.22 |
| 85 | 49 | Jul 90 | 168.73017 | 0.63 | 298.59547 | -1.13 | 1.76 | -4.10 | 4.73 |
| 86 | 50 | Aug 90 | 169.77630 | 0.62 | 269.33915 | -9.80 | 10.42 | -12.50 | 13.12 |
| 87 | 51 | Sep 90 | 170.81194 | 0.61 | 252.24782 | -6.35 | 6.96 | -9.16 | 9.77 |
| 88 | 52 | Oct 90 | 171.83681 | 0.60 | 249.13117 | -1.24 | 1.84 | -4.20 | 4.80 |
| 89 | 53 | Nov 90 | 172.85065 | 0.59 | 267.98190 | 7.57 | 0.00 | 4.34 | 0.00 |
| 90 | 54 | Dec 90 | 173.81861 | 0.56 | 276.29826 | 3.10 | 0.00 | 0.01 | 0.55 |
| 91 | 55 | Jan 91 | 174.72247 | 0.52 | 295.61301 | 6.99 | 0.00 | 3.78 | 0.00 |
| 92 | 56 | Feb 91 | 175.57861 | 0.49 | 321.28062 | 8.68 | 0.00 | 5.42 | 0.00 |
| 93 | 57 | Mar 91 | 176.43894 | 0.49 | 332.19319 | 3.40 | 0.00 | 0.29 | 0.20 |
| 94 | 58 | Apr 91 | 177.26820 | 0.47 | 333.42278 | 0.37 | 0.10 | -2.64 | 3.11 |
| 95 | 59 | May 91 | 178.06591 | 0.45 | 352.43426 | 5.70 | 0.00 | 2.53 | 0.00 |

Fig. 6F

| (1) | (2) | (3) | (4) | (5) | (6) | (7) | (8) | (9) | (10) |
|---|---|---|---|---|---|---|---|---|---|
| 96 | 60 | Jun 91 | 178.88501 | 0.46 | 331.72459 | -5.88 | 6.34 | -8.70 | 9.16 |
| 97 | 61 | Jul 91 | 179.70788 | 0.46 | 352.32860 | 6.21 | 0.00 | 3.02 | 0.00 |
| 98 | 62 | Aug 91 | 180.49860 | 0.44 | 363.15891 | 3.07 | 0.00 | -0.02 | 0.46 |
| 99 | 63 | Sep 91 | 181.27474 | 0.43 | 361.78531 | -0.38 | 0.81 | -3.37 | 3.80 |
| 100 | 64 | Oct 91 | 182.03610 | 0.42 | 366.64574 | 1.34 | 0.00 | -1.70 | 2.12 |
| 101 | 65 | Nov 91 | 182.72783 | 0.38 | 348.52478 | -4.94 | 5.32 | -7.79 | 8.17 |
| 102 | 66 | Dec 91 | 183.34911 | 0.34 | 389.65896 | 11.80 | 0.00 | 8.45 | 0.00 |
| 103 | 67 | Jan 92 | 183.93583 | 0.32 | 389.82934 | 0.04 | 0.28 | -2.96 | 3.28 |
| 104 | 68 | Feb 92 | 184.52442 | 0.32 | 397.72361 | 2.03 | 0.00 | -1.04 | 1.36 |
| 105 | 69 | Mar 92 | 185.15180 | 0.34 | 386.93288 | -2.71 | 3.05 | -5.63 | 5.97 |
| 106 | 70 | Apr 92 | 185.72577 | 0.31 | 392.66901 | 1.48 | 0.00 | -1.56 | 1.87 |
| 107 | 71 | May 92 | 186.28295 | 0.30 | 396.43123 | 0.96 | 0.00 | -2.07 | 2.37 |
| 108 | 72 | Jun 92 | 186.84180 | 0.30 | 389.44860 | -1.76 | 2.06 | -4.71 | 5.01 |
| 109 | 73 | Jul 92 | 187.34627 | 0.27 | 400.37793 | 2.81 | 0.00 | -0.28 | 0.55 |
| 110 | 74 | Aug 92 | 187.83337 | 0.26 | 391.69518 | -2.17 | 2.43 | -5.10 | 5.36 |
| 111 | 75 | Sep 92 | 188.28417 | 0.24 | 396.18835 | 1.15 | 0.00 | -1.89 | 2.13 |
| 112 | 76 | Oct 92 | 188.73606 | 0.24 | 398.98140 | 0.70 | 0.00 | -2.32 | 2.56 |
| 113 | 77 | Nov 92 | 189.22677 | 0.26 | 409.06068 | 2.53 | 0.00 | -0.55 | 0.81 |
| 114 | 78 | Dec 92 | 189.73768 | 0.27 | 416.99186 | 1.94 | 0.00 | -1.12 | 1.39 |
| 115 | 79 | Jan 93 | 190.21203 | 0.25 | 427.97752 | 2.63 | 0.00 | -0.44 | 0.69 |
| 116 | 80 | Feb 93 | 190.66854 | 0.24 | 436.91164 | 2.09 | 0.00 | -0.98 | 1.22 |
| 117 | 81 | Mar 93 | 191.14521 | 0.25 | 452.92688 | 3.67 | 0.00 | 0.56 | 0.00 |

*Fig. 6G*

| (1) | (2) | (3) | (4) | (5) | (6) | (7) | (8) | (9) | (10) |
|---|---|---|---|---|---|---|---|---|---|
| 118 | 82 | Apr 93 | 191.60396 | 0.24 | 457.36085 | 0.98 | 0.00 | -2.05 | 2.29 |
| 119 | 83 | May 93 | 192.08297 | 0.25 | 475.38749 | 3.94 | 0.00 | 0.82 | 0.00 |
| 120 | 84 | Jun 93 | 192.58238 | 0.26 | 482.01695 | 1.39 | 0.00 | -1.65 | 1.91 |

(1) Total of Monthly Rates     110.33    125.81    -144.98    259.62
(2) Average Monthly Rate (1) / 84    1.31    1.50    -1.73    3.09
(3) Average Annual Rate of Risk-Adjusted Return      -2.19      -44.70

Note on the caluculation

Item (3)

MEASURING INVESTMENT RISK (SHORTFALL) AND RISK-ADJUSTED RETURN

ONE YEAR HOLDING PERIOD - FIDELITY MAGELLAN FUND (3% Sales Load)

| (1) | (2) | (3) | (4) | (5) | (6) | (7) | (8) | (9) | (10) |
|---|---|---|---|---|---|---|---|---|---|
| | | | | T-Bill 12 Month Change % | Fund Total Return Index | Fund 12 Month Change % | Fund Annual Shortfall = (5)-(7) if Positive % | Load Adjusted Fund 12 Month Change % | Load Adjusted Annual Fund Shortfall =(5)-(9) if Positive -% |
| Item # | Observ. # | Month* | 3 Month T-Bill Value Index | | | | | | |
| 0 | | Jun 83 | 100.00000 | | 100.00000 | | | | |
| 1 | | Jul 83 | 100.76000 | | 96.52956 | | | | |
| 2 | | Aug 83 | 101.54593 | | 94.37018 | | | | |
| 3 | | Sep 83 | 102.30752 | | 97.53213 | | | | |
| 4 | | Oct 83 | 103.04414 | | 93.29049 | | | | |
| 5 | | Nov 83 | 103.79636 | | 97.48072 | | | | |
| 6 | | Dec 83 | 104.57483 | | 95.96401 | | | | |
| 7 | | Jan 84 | 105.34869 | | 95.08997 | | | | |
| 8 | | Feb 84 | 106.14934 | | 88.92031 | | | | |

* i.e. The close of the market on the last day on which the Stock Exchanges were open in the month.

*Fig. 7B*

| (1) | (2) | (3) | (4) | (5) | (6) | (7) | (8) | (9) | (10) |
|---|---|---|---|---|---|---|---|---|---|
| 9 |  | Mar 84 | 106.98792 |  | 90.51414 |  |  |  |  |
| 10 |  | Apr 84 | 107.85452 |  | 89.79434 |  |  |  |  |
| 11 |  | May 84 | 108.73892 |  | 83.66897 |  |  |  |  |
| 12 |  | Jun 84 | 109.63058 |  | 86.37172 |  |  |  |  |
| 13 |  | Jul 84 | 110.55148 |  | 85.00581 |  |  |  |  |
| 14 |  | Aug 84 | 111.51328 |  | 94.91589 |  |  |  |  |
| 15 |  | Sep 84 | 112.47229 |  | 95.09026 |  |  |  |  |
| 16 |  | Oct 84 | 113.38332 |  | 96.31086 |  |  |  |  |
| 17 |  | Nov 84 | 114.19968 |  | 95.14839 |  |  |  |  |
| 18 |  | Dec 84 | 114.96482 |  | 97.90926 |  |  |  |  |
| 19 |  | Jan 85 | 115.71209 |  | 107.81934 |  |  |  |  |
| 20 |  | Feb 85 | 116.51050 |  | 108.57495 |  |  |  |  |
| 21 |  | Mar 85 | 117.33772 |  | 109.53399 |  |  |  |  |
| 22 |  | Apr 85 | 118.11215 |  | 110.11522 |  |  |  |  |
| 23 |  | May 85 | 118.84445 |  | 116.06846 |  |  |  |  |
| 24 |  | Jun 85 | 119.53375 |  | 119.53967 |  |  |  |  |
| 25 |  | Jul 85 | 120.23900 |  | 120.43846 |  |  |  |  |
| 26 |  | Aug 85 | 120.94841 |  | 121.02733 |  |  |  |  |
| 27 |  | Sep 85 | 121.66200 |  | 115.35562 |  |  |  |  |
| 28 |  | Oct 85 | 122.39197 |  | 122.82492 |  |  |  |  |
| 29 |  | Nov 85 | 123.12633 |  | 133.20754 |  |  |  |  |
| 30 |  | Dec 85 | 123.85277 |  | 140.11896 |  |  |  |  |

Fig. 7C

| (1) | (2) | (3) | (4) | (5) | (6) | (7) | (8) | (9) | (10) |
|---|---|---|---|---|---|---|---|---|---|
| 31 |   | Jan 86 | 124.58350 |   |   |   |   |   |   |
| 32 |   | Feb 86 | 125.31854 |   |   |   |   |   |   |
| 33 |   | Mar 86 | 126.00780 |   |   |   |   |   |   |
| 34 |   | Apr 86 | 126.63784 |   |   |   |   |   |   |
| 35 |   | May 86 | 127.28369 |   |   |   |   |   |   |
| 36 | 0 | Jun 86 | 127.94556 |   |   |   |   |   |   |
| 37 | 1 | Jul 86 | 128.57250 | 6.93 | 145.63570 |   |   |   |   |
| 38 | 2 | Aug 86 | 129.16393 | 6.79 | 160.69826 |   |   |   |   |
| 39 | 3 | Sep 86 | 129.71934 | 6.62 | 171.51478 |   |   |   |   |
| 40 | 4 | Oct 86 | 130.27713 | 6.44 | 172.28961 |   |   |   |   |
| 41 | 5 | Nov 86 | 130.86338 | 6.28 | 177.95169 |   |   |   |   |
| 42 | 6 | Dec 86 | 131.46535 | 6.15 | 182.19344 |   |   |   |   |
| 43 | 7 | Jan 87 | 132.05694 | 6.00 | 170.04048 | 41.18 | 0.00 | 36.95 | 0.00 |
| 44 | 8 | Feb 87 | 132.67761 | 5.87 | 180.98151 | 49.54 | 0.00 | 45.05 | 0.00 |
| 45 | 9 | Mar 87 | 133.30119 | 5.79 | 165.59674 | 43.55 | 0.00 | 39.25 | 0.00 |
| 46 | 10 | Apr 87 | 133.92771 | 5.76 | 174.24857 | 41.87 | 0.00 | 37.61 | 0.00 |
| 47 | 11 | May 87 | 134.55717 | 5.71 | 175.99914 | 32.12 | 0.00 | 28.16 | 0.00 |
| 48 | 12 | Jun 87 | 135.18959 | 5.66 | 173.38923 | 23.74 | 0.00 | 20.03 | 0.00 |
| 49 | 13 | Jul 87 | 135.82498 | 5.64 | 195.93090 | 34.53 | 0.00 | 30.50 | 0.00 |
| 50 | 14 | Aug 87 | 136.50410 | 5.68 | 210.46013 | 30.97 | 0.00 | 27.04 | 0.00 |
| 51 | 15 | Sep 87 | 137.22758 | 5.79 | 213.13094 | 24.26 | 0.00 | 20.54 | 0.00 |
| 52 | 16 | Oct 87 | 137.92744 | 5.87 | 209.49864 | 21.60 | 0.00 | 17.95 | 0.00 |
|   |   |   |   |   | 209.92607 | 17.97 | 0.00 | 14.43 | 0.00 |
|   |   |   |   |   | 218.61651 | 19.99 | 0.00 | 16.39 | 0.00 |
|   |   |   |   |   | 229.30018 | 34.85 | 0.00 | 30.80 | 0.00 |
|   |   |   |   |   | 238.50886 | 31.79 | 0.00 | 27.83 | 0.00 |
|   |   |   |   |   | 232.64879 | 40.49 | 0.00 | 36.28 | 0.00 |
|   |   |   |   |   | 172.61297 | -0.94 | 6.81 | -3.91 | 9.78 |

Fig. 7D

| (1) | (2) | (3) | (4) | (5) | (6) | (7) | (8) | (9) | (10) |
|---|---|---|---|---|---|---|---|---|---|
| 53 | 17 | Nov 87 | 138.57570 | 5.89 | 159.57730 | -9.33 | 15.22 | -12.05 | 17.94 |
| 54 | 18 | Dec 87 | 139.24086 | 5.91 | 175.12402 | 1.00 | 4.91 | -2.03 | 7.94 |
| 55 | 19 | Jan 88 | 139.90922 | 5.95 | 182.06784 | -7.08 | 13.02 | -9.86 | 15.81 |
| 56 | 20 | Feb 88 | 140.56679 | 5.95 | 193.11681 | -8.24 | 14.19 | -10.99 | 16.94 |
| 57 | 21 | Mar 88 | 141.22745 | 5.95 | 192.59274 | -9.64 | 15.58 | -12.35 | 18.29 |
| 58 | 22 | Apr 88 | 141.91947 | 5.97 | 196.04282 | -6.42 | 12.39 | -9.23 | 15.20 |
| 59 | 23 | May 88 | 142.65745 | 6.02 | 195.51876 | -6.86 | 12.88 | -9.66 | 15.68 |
| 60 | 24 | Jun 88 | 143.42780 | 6.09 | 208.88234 | -4.45 | 10.55 | -7.32 | 13.41 |
| 61 | 25 | Jul 88 | 144.23099 | 6.19 | 207.52851 | -9.49 | 15.68 | -12.21 | 18.40 |
| 62 | 26 | Aug 88 | 145.08196 | 6.28 | 200.93406 | -15.75 | 22.04 | -18.28 | 24.57 |
| 63 | 27 | Sep 88 | 145.95245 | 6.36 | 209.36273 | -10.01 | 16.37 | -12.71 | 19.07 |
| 64 | 28 | Oct 88 | 146.84276 | 6.46 | 213.72991 | 23.82 | 0.00 | 20.11 | 0.00 |
| 65 | 29 | Nov 88 | 147.79724 | 6.65 | 210.84757 | 32.13 | 0.00 | 28.16 | 0.00 |
| 66 | 30 | Dec 88 | 148.78748 | 6.86 | 214.99050 | 22.76 | 0.00 | 19.08 | 0.00 |
| 67 | 31 | Jan 89 | 149.81411 | 7.08 | 232.43178 | 27.66 | 0.00 | 23.83 | 0.00 |
| 68 | 32 | Feb 89 | 150.87779 | 7.34 | 228.64987 | 18.40 | 0.00 | 14.85 | 0.00 |
| 69 | 33 | Mar 89 | 151.97920 | 7.61 | 235.45731 | 22.26 | 0.00 | 18.59 | 0.00 |
| 70 | 34 | Apr 89 | 153.07345 | 7.86 | 247.29246 | 26.14 | 0.00 | 22.36 | 0.00 |
| 71 | 35 | May 89 | 154.14496 | 8.05 | 260.34873 | 33.16 | 0.00 | 29.16 | 0.00 |
| 72 | 36 | Jun 89 | 155.19315 | 8.20 | 258.08994 | 23.56 | 0.00 | 19.85 | 0.00 |
| 73 | 37 | Jul 89 | 156.21742 | 8.31 | 279.77437 | 34.81 | 0.00 | 30.77 | 0.00 |
| 74 | 38 | Aug 89 | 157.24846 | 8.39 | 287.09287 | 42.88 | 0.00 | 38.59 | 0.00 |

Fig. 7E

| (1) | (2) | (3) | (4) | (5) | (6) | (7) | (8) | (9) | (10) |
|---|---|---|---|---|---|---|---|---|---|
| 75 | 39 | Sep 89 | 158.27057 | 8.44 | 292.06222 | 39.50 | 0.00 | 35.32 | 0.00 |
| 76 | 40 | Oct 89 | 159.28351 | 8.47 | 282.89151 | 32.36 | 0.00 | 28.39 | 0.00 |
| 77 | 41 | Nov 89 | 160.30292 | 8.46 | 287.54463 | 36.38 | 0.00 | 32.28 | 0.00 |
| 78 | 42 | Dec 89 | 161.32886 | 8.43 | 289.34370 | 34.58 | 0.00 | 30.55 | 0.00 |
| 79 | 43 | Jan 90 | 162.36136 | 8.38 | 270.68261 | 16.46 | 0.00 | 12.96 | 0.00 |
| 80 | 44 | Feb 90 | 163.40048 | 8.30 | 276.24226 | 20.81 | 0.00 | 17.19 | 0.00 |
| 81 | 45 | Mar 90 | 164.47892 | 8.22 | 283.30060 | 20.32 | 0.00 | 16.71 | 0.00 |
| 82 | 46 | Apr 90 | 165.54803 | 8.15 | 276.14557 | 11.67 | 0.00 | 8.32 | 0.00 |
| 83 | 47 | May 90 | 166.60754 | 8.08 | 300.70675 | 15.50 | 0.00 | 12.04 | 0.00 |
| 84 | 48 | Jun 90 | 167.67383 | 8.04 | 302.01374 | 17.02 | 0.00 | 13.51 | 0.00 |
| 85 | 49 | Jul 90 | 168.73017 | 8.01 | 298.59547 | 6.73 | 1.28 | 3.53 | 4.48 |
| 86 | 50 | Aug 90 | 169.77630 | 7.97 | 269.33915 | -6.18 | 14.15 | -9.00 | 16.97 |
| 87 | 51 | Sep 90 | 170.81194 | 7.92 | 252.24782 | -13.63 | 21.56 | -16.22 | 24.15 |
| 88 | 52 | Oct 90 | 171.83681 | 7.88 | 249.13117 | -11.93 | 19.82 | -14.58 | 22.46 |
| 89 | 53 | Nov 90 | 172.85065 | 7.83 | 267.98190 | -6.80 | 14.63 | -9.60 | 17.43 |
| 90 | 54 | Dec 90 | 173.81861 | 7.74 | 276.29826 | -4.51 | 12.25 | -7.37 | 15.12 |
| 91 | 55 | Jan 91 | 174.72247 | 7.61 | 295.61301 | 9.21 | 0.00 | 5.93 | 1.68 |
| 92 | 56 | Feb 91 | 175.57861 | 7.45 | 321.28062 | 16.30 | 0.00 | 12.81 | 0.00 |
| 93 | 57 | Mar 91 | 176.43894 | 7.27 | 332.19319 | 17.26 | 0.00 | 13.74 | 0.00 |
| 94 | 58 | Apr 91 | 177.26820 | 7.08 | 333.42278 | 20.74 | 0.00 | 17.12 | 0.00 |
| 95 | 59 | May 91 | 178.06591 | 6.88 | 352.43426 | 17.20 | 0.00 | 13.69 | 0.00 |
| 96 | 60 | Jun 91 | 178.88501 | 6.69 | 331.72459 | 9.84 | 0.00 | 6.54 | 0.14 |

Fig. 7F

| (1) | (2) | (3) | (4) | (5) | (6) | (7) | (8) | (9) | (10) |
|---|---|---|---|---|---|---|---|---|---|
| 97 | 61 | Jul 91 | 179.70788 | 6.51 | 352.32860 | 18.00 | 0.00 | 14.46 | 0.00 |
| 98 | 62 | Aug 91 | 180.49860 | 6.32 | 363.15891 | 34.83 | 0.00 | 30.79 | 0.00 |
| 99 | 63 | Sep 91 | 181.27474 | 6.13 | 361.78531 | 43.42 | 0.00 | 39.12 | 0.00 |
| 100 | 64 | Oct 91 | 182.03610 | 5.94 | 366.64574 | 47.17 | 0.00 | 42.75 | 0.00 |
| 101 | 65 | Nov 91 | 182.72783 | 5.71 | 348.52478 | 30.06 | 0.00 | 26.15 | 0.00 |
| 102 | 66 | Dec 91 | 183.34911 | 5.48 | 389.65896 | 41.03 | 0.00 | 36.80 | 0.00 |
| 103 | 67 | Jan 92 | 183.93583 | 5.27 | 389.82934 | 31.87 | 0.00 | 27.92 | 0.00 |
| 104 | 68 | Feb 92 | 184.52442 | 5.10 | 397.72361 | 23.79 | 0.00 | 20.08 | 0.00 |
| 105 | 69 | Mar 92 | 185.15180 | 4.94 | 386.93288 | 16.48 | 0.00 | 12.98 | 0.00 |
| 106 | 70 | Apr 92 | 185.72577 | 4.77 | 392.66901 | 17.77 | 0.00 | 14.24 | 0.00 |
| 107 | 71 | May 92 | 186.28295 | 4.61 | 396.43123 | 12.48 | 0.00 | 9.11 | 0.00 |
| 108 | 72 | Jun 92 | 186.84180 | 4.45 | 389.44860 | 17.40 | 0.00 | 13.88 | 0.00 |
| 109 | 73 | Jul 92 | 187.34627 | 4.25 | 400.37793 | 13.64 | 0.00 | 10.23 | 0.00 |
| 110 | 74 | Aug 92 | 187.83337 | 4.06 | 391.69518 | 7.86 | 0.00 | 4.62 | 0.00 |
| 111 | 75 | Sep 92 | 188.28417 | 3.87 | 396.18835 | 9.51 | 0.00 | 6.22 | 0.00 |
| 112 | 76 | Oct 92 | 188.73606 | 3.68 | 398.98140 | 8.82 | 0.00 | 5.55 | 0.00 |
| 113 | 77 | Nov 92 | 189.22677 | 3.56 | 409.06068 | 17.37 | 0.00 | 13.85 | 0.00 |
| 114 | 78 | Dec 92 | 189.73768 | 3.48 | 416.99186 | 7.01 | 0.00 | 3.80 | 0.00 |
| 115 | 79 | Jan 93 | 190.21203 | 3.41 | 427.97752 | 9.79 | 0.00 | 6.49 | 0.00 |
| 116 | 80 | Feb 93 | 190.66854 | 3.33 | 436.91164 | 9.85 | 0.00 | 6.56 | 0.00 |
| 117 | 81 | Mar 93 | 191.14521 | 3.24 | 452.92688 | 17.06 | 0.00 | 13.54 | 0.00 |
| 118 | 82 | Apr 93 | 191.60396 | 3.16 | 457.36085 | 16.47 | 0.00 | 12.98 | 0.00 |

| (1) | (2) | (3) | (4) | (5) | (6) | (7) | (8) | (9) | (10) |
|---|---|---|---|---|---|---|---|---|---|
| 119 | 83 | May 93 | 192.08297 | 3.11 | 475.38749 | 19.92 | 0.00 | 16.32 | 0.00 |
| 120 | 84 | Jun 93 | 192.58238 | 3.07 | 482.01695 | 23.77 | 0.00 | 20.06 | 0.00 |

(1) Total of Annual Rates (Change %)    1503.01    243.33    1205.92    295.45
(2) Average Annual Rate (1)/84    17.89    2.90    14.36    3.52
(3) Average Annual Rate of Risk-Adjusted Return    14.99    10.84

*Fig. 7G*

MEASURING INVESTMENT RISK (SHORTFALL) AND RISK-ADJUSTED RETURN

*THREE YEAR HOLDING PERIOD - FIDELITY MAGELLAN FUND (3% Sales Load)*

Fig. 8A

| (1) | (2) | (3) | (4) | (5) | (6) | (7) | (8) | (9) | (10) | (11) | (12) |
|---|---|---|---|---|---|---|---|---|---|---|---|
| | | | 3 Month T-Bill Return Index | T-Bill 36 Month Change % | T-Bill 36 Month Annual-ized Change % | Fund Total Return Index | Fund 36 Month Change % | Fund 36 Month Annual-ized Change % | Fund Annual Shortfall = (6)-(9) If Positive % | Load Adjusted Fund 36 Month Annual-ized Change % | Load Adjusted Annual Fund Shortfall =(6)-(11) If Positive % |
| Item # | Observ. # | Month* | | | | | | | | | |
| 0 | | Jun 83 | 100.00000 | | | 100.00000 | | | | | |
| 1 | | Jul 83 | 100.76000 | | | 96.52956 | | | | | |
| 2 | | Aug 83 | 101.54593 | | | 94.37018 | | | | | |
| 3 | | Sep 83 | 102.30752 | | | 97.53213 | | | | | |
| 4 | | Oct 83 | 103.04414 | | | 93.29049 | | | | | |
| 5 | | Nov 83 | 103.79636 | | | 97.48072 | | | | | |
| 6 | | Dec 83 | 104.57483 | | | 95.96401 | | | | | |

*i.e. The close of the market on the last day on which the Stock Exchanges were open in the month.

Fig. 8B

| (1) | (2) | (3) | (4) | (5) | (6) | (7) | (8) | (9) | (10) | (11) | (12) |
|---|---|---|---|---|---|---|---|---|---|---|---|
| 7 | | Jan 84 | 105.34869 | | | 95.08997 | | | | | |
| 8 | | Feb 84 | 106.14934 | | | 88.92031 | | | | | |
| 9 | | Mar 84 | 106.98792 | | | 90.51414 | | | | | |
| 10 | | Apr 84 | 107.85452 | | | 89.79434 | | | | | |
| 11 | | May 84 | 108.73892 | | | 83.66897 | | | | | |
| 12 | | Jun 84 | 109.63058 | | | 86.37172 | | | | | |
| 13 | | Jul 84 | 110.55148 | | | 85.00581 | | | | | |
| 14 | | Aug 84 | 111.51328 | | | 94.91589 | | | | | |
| 15 | | Sep 84 | 112.47229 | | | 95.09026 | | | | | |
| 16 | | Oct 84 | 113.38332 | | | 96.31086 | | | | | |
| 17 | | Nov 84 | 114.19968 | | | 95.14839 | | | | | |
| 18 | | Dec 84 | 114.96482 | | | 97.90926 | | | | | |
| 19 | | Jan 85 | 115.71209 | | | 107.81934 | | | | | |
| 20 | | Feb 85 | 116.51050 | | | 108.57495 | | | | | |
| 21 | | Mar 85 | 117.33772 | | | 109.53399 | | | | | |
| 22 | | Apr 85 | 118.11215 | | | 110.11522 | | | | | |
| 23 | | May 85 | 118.84445 | | | 116.06846 | | | | | |
| 24 | | Jun 85 | 119.53375 | | | 119.53967 | | | | | |
| 25 | | Jul 85 | 120.23900 | | | 120.43846 | | | | | |
| 26 | | Aug 85 | 120.94841 | | | 121.02733 | | | | | |
| 27 | | Sep 85 | 121.66200 | | | 115.35562 | | | | | |
| 28 | | Oct 85 | 122.39197 | | | 122.82492 | | | | | |
| 29 | | Nov 85 | 123.12633 | | | 133.20754 | | | | | |

*Fig. 8C*

| (1) | (2) | (3) | (4) | (5) | (6) | (7) | (8) | (9) | (10) | (11) | (12) |
|---|---|---|---|---|---|---|---|---|---|---|---|
| 30 | | Dec 85 | 123.85277 | | | 140.11896 | | | | | |
| 31 | | Jan 86 | 124.58350 | | | 145.63570 | | | | | |
| 32 | | Feb 86 | 125.31854 | | | 160.69826 | | | | | |
| 33 | | Mar 86 | 126.00780 | | | 171.51478 | | | | | |
| 34 | | Apr 86 | 126.63784 | | | 172.28961 | | | | | |
| 35 | | May 86 | 127.28369 | | | 177.95169 | | | | | |
| 36 | 0 | Jun 86 | 127.94556 | | | 182.19344 | | | | | |
| 37 | 1 | Jul 86 | 128.57250 | 27.60 | 8.46 | 170.04048 | 76.15 | 20.77 | 0.00 | 19.55 | 0.00 |
| 38 | 2 | Aug 86 | 129.16393 | 27.20 | 8.35 | 180.98151 | 91.78 | 24.24 | 0.00 | 22.99 | 0.00 |
| 39 | 3 | Sep 86 | 129.71934 | 26.79 | 8.23 | 165.59674 | 69.79 | 19.30 | 0.00 | 18.09 | 0.00 |
| 40 | 4 | Oct 86 | 130.27713 | 26.43 | 8.13 | 174.24857 | 86.78 | 23.15 | 0.00 | 21.91 | 0.00 |
| 41 | 5 | Nov 86 | 130.86338 | 26.08 | 8.03 | 175.99914 | 80.55 | 21.77 | 0.00 | 20.54 | 0.00 |
| 42 | 6 | Dec 86 | 131.46535 | 25.71 | 7.93 | 173.38923 | 80.68 | 21.80 | 0.00 | 20.57 | 0.00 |
| 43 | 7 | Jan 87 | 132.05694 | 25.35 | 7.82 | 195.93090 | 106.05 | 27.25 | 0.00 | 25.96 | 0.00 |
| 44 | 8 | Feb 87 | 132.67761 | 24.99 | 7.72 | 210.46013 | 136.68 | 33.27 | 0.00 | 31.92 | 0.00 |
| 45 | 9 | Mar 87 | 133.30119 | 24.59 | 7.61 | 213.13094 | 135.47 | 33.04 | 0.00 | 31.69 | 0.00 |
| 46 | 10 | Apr 87 | 133.92771 | 24.17 | 7.48 | 209.49864 | 133.31 | 32.63 | 0.00 | 31.29 | 0.00 |
| 47 | 11 | May 87 | 134.55717 | 23.74 | 7.36 | 209.92607 | 150.90 | 35.88 | 0.00 | 34.51 | 0.00 |
| 48 | 12 | Jun 87 | 135.18959 | 23.31 | 7.24 | 218.61651 | 153.11 | 36.28 | 0.00 | 34.91 | 0.00 |
| 49 | 13 | Jul 87 | 135.82498 | 22.86 | 7.10 | 229.30018 | 169.75 | 39.20 | 0.00 | 37.80 | 0.00 |
| 50 | 14 | Aug 87 | 136.50410 | 22.41 | 6.97 | 238.50886 | 151.28 | 35.95 | 0.00 | 34.58 | 0.00 |
| 51 | 15 | Sep 87 | 137.22758 | 22.01 | 6.86 | 232.64879 | 144.66 | 34.75 | 0.00 | 33.39 | 0.00 |
| 52 | 16 | Oct 87 | 137.92744 | 21.65 | 6.75 | 172.61297 | 79.22 | 21.47 | 0.00 | 20.24 | 0.00 |

Fig. 8D

| (1) | (2) | (3) | (4) | (5) | (6) | (7) | (8) | (9) | (10) | (11) | (12) |
|---|---|---|---|---|---|---|---|---|---|---|---|
| 53 | 17 | Nov 87 | 138.57570 | 21.35 | 6.66 | 159.57730 | 67.71 | 18.81 | 0.00 | 17.61 | 0.00 |
| 54 | 18 | Dec 87 | 139.24086 | 21.12 | 6.59 | 175.12402 | 78.86 | 21.39 | 0.00 | 20.16 | 0.00 |
| 55 | 19 | Jan 88 | 139.90922 | 20.91 | 6.53 | 182.06784 | 68.86 | 19.08 | 0.00 | 17.88 | 0.00 |
| 56 | 20 | Feb 88 | 140.56679 | 20.65 | 6.46 | 193.11681 | 77.86 | 21.16 | 0.00 | 19.94 | 0.00 |
| 57 | 21 | Mar 88 | 141.22745 | 20.36 | 6.37 | 192.59274 | 75.83 | 20.70 | 0.00 | 19.48 | 0.00 |
| 58 | 22 | Apr 88 | 141.91947 | 20.16 | 6.31 | 196.04282 | 78.03 | 21.20 | 0.00 | 19.98 | 0.00 |
| 59 | 23 | May 88 | 142.65745 | 20.04 | 6.28 | 195.51876 | 68.45 | 18.98 | 0.00 | 17.78 | 0.00 |
| 60 | 24 | Jun 88 | 143.42780 | 19.99 | 6.26 | 208.88234 | 74.74 | 20.45 | 0.00 | 19.23 | 0.00 |
| 61 | 25 | Jul 88 | 144.23099 | 19.95 | 6.25 | 207.52851 | 72.31 | 19.89 | 0.00 | 18.68 | 0.00 |
| 62 | 26 | Aug 88 | 145.08196 | 19.95 | 6.25 | 200.93406 | 66.02 | 18.41 | 0.00 | 17.21 | 0.00 |
| 63 | 27 | Sep 88 | 145.95245 | 19.97 | 6.26 | 209.36273 | 81.49 | 21.98 | 0.00 | 20.75 | 0.00 |
| 64 | 28 | Oct 88 | 146.84276 | 19.98 | 6.26 | 213.72991 | 74.01 | 20.28 | 0.00 | 19.07 | 0.00 |
| 65 | 29 | Nov 88 | 147.79724 | 20.04 | 6.28 | 210.84757 | 58.29 | 16.54 | 0.00 | 15.36 | 0.00 |
| 66 | 30 | Dec 88 | 148.78748 | 20.13 | 6.30 | 214.99050 | 53.43 | 15.34 | 0.00 | 14.17 | 0.00 |
| 67 | 31 | Jan 89 | 149.81411 | 20.25 | 6.34 | 232.43178 | 59.60 | 16.86 | 0.00 | 15.68 | 0.00 |
| 68 | 32 | Feb 89 | 150.87779 | 20.40 | 6.38 | 228.64987 | 42.29 | 12.47 | 0.00 | 11.34 | 0.00 |
| 69 | 33 | Mar 89 | 151.97920 | 20.61 | 6.45 | 235.45731 | 37.28 | 11.14 | 0.00 | 10.02 | 0.00 |
| 70 | 34 | Apr 89 | 153.07345 | 20.87 | 6.52 | 247.29246 | 43.53 | 12.80 | 0.00 | 11.66 | 0.00 |
| 71 | 35 | May 89 | 154.14496 | 21.10 | 6.59 | 260.34873 | 46.30 | 13.52 | 0.00 | 12.38 | 0.00 |
| 72 | 36 | Jun 89 | 155.19315 | 21.30 | 6.65 | 258.08994 | 41.66 | 12.31 | 0.00 | 11.17 | 0.00 |
| 73 | 37 | Jul 89 | 156.21742 | 21.50 | 6.71 | 279.77437 | 64.53 | 18.06 | 0.00 | 16.86 | 0.00 |
| 74 | 38 | Aug 89 | 157.24846 | 21.74 | 6.78 | 287.09287 | 58.63 | 16.63 | 0.00 | 15.45 | 0.00 |
| 75 | 39 | Sep 89 | 158.27057 | 22.01 | 6.86 | 292.06222 | 76.37 | 20.82 | 0.00 | 19.60 | 0.00 |

Fig. 8E

| (1) | (2) | (3) | (4) | (5) | (6) | (7) | (8) | (9) | (10) | (11) | (12) |
|---|---|---|---|---|---|---|---|---|---|---|---|
| 76 | 40 | Oct 89 | 159.28351 | 22.27 | 6.93 | 282.89151 | 62.35 | 17.53 | 0.00 | 16.34 | 0.00 |
| 77 | 41 | Nov 89 | 160.30292 | 22.50 | 7.00 | 287.54463 | 63.38 | 17.78 | 0.00 | 16.59 | 0.00 |
| 78 | 42 | Dec 89 | 161.32886 | 22.72 | 7.06 | 289.34370 | 66.88 | 18.61 | 0.00 | 17.41 | 0.00 |
| 79 | 43 | Jan 90 | 162.36136 | 22.95 | 7.13 | 270.68261 | 38.15 | 11.37 | 0.00 | 10.25 | 0.00 |
| 80 | 44 | Feb 90 | 163.40048 | 23.16 | 7.19 | 276.24226 | 31.26 | 9.49 | 0.00 | 8.38 | 0.00 |
| 81 | 45 | Mar 90 | 164.47892 | 23.39 | 7.26 | 283.30060 | 32.92 | 9.95 | 0.00 | 8.84 | 0.00 |
| 82 | 46 | Apr 90 | 165.54803 | 23.61 | 7.32 | 276.14557 | 31.81 | 9.64 | 0.00 | 8.54 | 0.00 |
| 83 | 47 | May 90 | 166.60754 | 23.82 | 7.38 | 300.70675 | 43.24 | 12.73 | 0.00 | 11.59 | 0.00 |
| 84 | 48 | Jun 90 | 167.67383 | 24.03 | 7.44 | 302.01374 | 38.15 | 11.37 | 0.00 | 10.25 | 0.00 |
| 85 | 49 | Jul 90 | 168.73017 | 24.23 | 7.50 | 298.59547 | 30.22 | 9.20 | 0.00 | 8.10 | 0.00 |
| 86 | 50 | Aug 90 | 169.77630 | 24.37 | 7.54 | 269.33915 | 12.93 | 4.14 | 3.41 | 3.08 | 4.46 |
| 87 | 51 | Sep 90 | 170.81194 | 24.47 | 7.57 | 252.24782 | 8.42 | 2.73 | 4.84 | 1.70 | 5.88 |
| 88 | 52 | Oct 90 | 171.83681 | 24.58 | 7.60 | 249.13117 | 44.33 | 13.01 | 0.00 | 11.87 | 0.00 |
| 89 | 53 | Nov 90 | 172.85065 | 24.73 | 7.65 | 267.98190 | 67.93 | 18.86 | 0.00 | 17.66 | 0.00 |
| 90 | 54 | Dec 90 | 173.81861 | 24.83 | 7.67 | 276.29826 | 55.77 | 16.42 | 0.00 | 15.24 | 0.00 |
| 91 | 55 | Jan 91 | 174.72247 | 24.88 | 7.69 | 295.61301 | 62.36 | 17.53 | 0.00 | 16.35 | 0.00 |
| 92 | 56 | Feb 91 | 175.57861 | 24.91 | 7.70 | 321.28062 | 66.37 | 18.49 | 0.00 | 17.29 | 0.00 |
| 93 | 57 | Mar 91 | 176.43894 | 24.93 | 7.70 | 332.19319 | 72.48 | 19.93 | 0.00 | 18.72 | 0.00 |
| 94 | 58 | Apr 91 | 177.26820 | 24.91 | 7.70 | 333.42278 | 70.08 | 19.37 | 0.00 | 18.16 | 0.00 |
| 95 | 59 | May 91 | 178.06591 | 24.82 | 7.67 | 352.43426 | 80.26 | 21.70 | 0.00 | 20.47 | 0.00 |
| 96 | 60 | Jun 91 | 178.88501 | 24.72 | 7.64 | 331.72459 | 58.81 | 16.67 | 0.00 | 15.49 | 0.00 |
| 97 | 61 | Jul 91 | 179.70788 | 24.60 | 7.61 | 352.32860 | 69.77 | 19.30 | 0.00 | 18.09 | 0.00 |
| 98 | 62 | Aug 91 | 180.49860 | 24.41 | 7.55 | 363.15891 | 80.74 | 21.81 | 0.00 | 20.58 | 0.00 |

*Fig. 8F*

| (1) | (2) | (3) | (4) | (5) | (6) | (7) | (8) | (9) | (10) | (11) | (12) |
|---|---|---|---|---|---|---|---|---|---|---|---|
| 99 | 63 | Sep 91 | 181.27474 | 24.20 | 7.49 | 361.78531 | 72.80 | 20.00 | 0.00 | 18.79 | 0.00 |
| 100 | 64 | Oct 91 | 182.03610 | 23.97 | 7.42 | 366.64574 | 71.55 | 19.71 | 0.00 | 18.50 | 0.00 |
| 101 | 65 | Nov 91 | 182.72783 | 23.63 | 7.33 | 348.52478 | 65.30 | 18.24 | 0.00 | 17.04 | 0.00 |
| 102 | 66 | Dec 91 | 183.34911 | 23.23 | 7.21 | 389.65896 | 81.24 | 21.92 | 0.00 | 20.69 | 0.00 |
| 103 | 67 | Jan 92 | 183.93583 | 22.78 | 7.08 | 389.82934 | 67.72 | 18.81 | 0.00 | 17.61 | 0.00 |
| 104 | 68 | Feb 92 | 184.52442 | 22.30 | 6.94 | 397.72361 | 73.94 | 20.26 | 0.00 | 19.05 | 0.00 |
| 105 | 69 | Mar 92 | 185.15180 | 21.83 | 6.80 | 386.93288 | 64.33 | 18.01 | 0.00 | 16.82 | 0.00 |
| 106 | 70 | Apr 92 | 185.72577 | 21.33 | 6.66 | 392.66901 | 58.79 | 16.66 | 0.00 | 15.49 | 0.00 |
| 107 | 71 | May 92 | 186.28295 | 20.85 | 6.52 | 396.43123 | 52.27 | 15.05 | 0.00 | 13.88 | 0.00 |
| 108 | 72 | Jun 92 | 186.84180 | 20.39 | 6.38 | 389.44860 | 50.90 | 14.70 | 0.00 | 13.54 | 0.00 |
| 109 | 73 | Jul 92 | 187.34627 | 19.93 | 6.24 | 400.37793 | 43.11 | 12.69 | 0.00 | 11.55 | 0.00 |
| 110 | 74 | Aug 92 | 187.83337 | 19.45 | 6.10 | 391.69518 | 36.44 | 10.91 | 0.00 | 9.79 | 0.00 |
| 111 | 75 | Sep 92 | 188.28417 | 18.96 | 5.96 | 396.18835 | 35.65 | 10.70 | 0.00 | 9.58 | 0.00 |
| 112 | 76 | Oct 92 | 188.73606 | 18.49 | 5.82 | 398.98140 | 41.04 | 12.14 | 0.00 | 11.01 | 0.00 |
| 113 | 77 | Nov 92 | 189.22677 | 18.04 | 5.69 | 409.06068 | 42.26 | 12.47 | 0.00 | 11.33 | 0.00 |
| 114 | 78 | Dec 92 | 189.73768 | 17.61 | 5.56 | 416.99186 | 44.12 | 12.95 | 0.00 | 11.81 | 0.00 |
| 115 | 79 | Jan 93 | 190.21203 | 17.15 | 5.42 | 427.97752 | 58.11 | 16.50 | 0.00 | 15.32 | 0.00 |
| 116 | 80 | Feb 93 | 190.66854 | 16.69 | 5.28 | 436.91164 | 58.16 | 16.51 | 0.00 | 15.33 | 0.00 |
| 117 | 81 | Mar 93 | 191.14521 | 16.21 | 5.14 | 452.92688 | 59.88 | 16.93 | 0.00 | 15.75 | 0.00 |
| 118 | 82 | Apr 93 | 191.60396 | 15.74 | 4.99 | 457.36085 | 65.62 | 18.32 | 0.00 | 17.12 | 0.00 |

Fig. 8G

| (1) | (2) | (3) | (4) | (5) | (6) | (7) | (8) | (9) | (10) | (11) | (12) |
|---|---|---|---|---|---|---|---|---|---|---|---|
| 119 | 83 | May 93 | 192.08297 | 15.29 | 4.86 | 475.38749 | 58.09 | 16.49 | 0.00 | 15.32 | 0.00 |
| 120 | 84 | Jun 93 | 192.58238 | 14.86 | 4.73 | 482.01695 | 59.60 | 16.86 | 0.00 | 15.68 | 0.00 |

(1) Total of Annual Rates  1564.05  8.24  1463.41  10.33
(2) Average Annual Rate (1) / 84  18.62  0.10  17.42  0.12
(3) Average Annual Rate of Risk-Adjusted Return  18.52  17.30

*Fig. 9A*

SUMMARY
Average Annual Rate - % of RISK-ADJUSTED RETURN                    Observations Ending 6-30-93

| Fund | | Mathers | | | Fidelity Magellan | | | AIM Constellation | | |
|---|---|---|---|---|---|---|---|---|---|---|
| Holding Period: | | 1 Month | 1 Year | 3 Years | 1 Month | 1 Year | 3 Years | 1 Month | 1 Year | 3 Years |

Analysis based on Net Asset Values only (Without recognition of sales loads)

Observations (No Sales Load)

| | | Mathers | | | Fidelity Magellan | | | AIM Constellation | | |
|---|---|---|---|---|---|---|---|---|---|---|
| Final | 36 Months | 1.39 | 6.99 | 9.16 | 3.00 | 12.94 | 15.77 | -4.07 | 20.04 | 19.96 |
| | 60 Months | 0.84 | 7.57 | 11.77 | 4.61 | 15.48 | 15.55 | -1.87 | 19.70 | 17.84 |
| | 84 Months | 0.79 | 12.15 | 14.16 | -2.19 | 14.99 | 18.52 | -7.90 | 18.31 | 18.59 |

Analysis Recognizing Sales Loads

| | | Front-End Load: 3% | | | Front-End Load: 5.5% | | |
|---|---|---|---|---|---|---|---|
| Final | 36 Months | -41.58 | 9.01 | 14.52 | -70.37 | 12.35 | 17.60 |
| | 60 Months | -40.91 | 11.53 | 14.35 | -68.84 | 12.14 | 15.46 |
| | 84 Months | -44.70 | 10.84 | 17.30 | -69.21 | 10.48 | 16.17 |

Fig. 9B

ANALYSIS
OF
RETURN AND RISK ELEMENTS
AS AFFECTED BY RECOGNITION OF
FRONT-END LOADS

Holding Period: 1 Year

| Fund | | Fidelity Magellan | | | AIM Constellation | | |
|---|---|---|---|---|---|---|---|
| | | Average Annual Rate - % of | | | Average Annual Rate - % of | | |
| Observations: Final | | Return | Shortfall | Risk-Adjusted Return | Return | Shortfall | Risk-Adjusted Return |
| With No Recognition of Front End Loads | 36 Months | 15.26 | 2.32 | 12.94 | 22.63 | 2.59 | 20.04 |
| | 60 Months | 17.78 | 2.30 | 15.48 | 22.45 | 2.75 | 19.70 |
| | 84 Months | 17.89 | 2.90 | 14.99 | 22.15 | 3.84 | 18.31 |
| Recognizing Front End Loads | 36 Months | 11.81 | 2.80 | 9.01 | 15.89 | 3.54 | 12.35 |
| | 60 Months | 14.24 | 2.71 | 11.53 | 15.72 | 3.58 | 12.14 |
| | 84 Months | 14.36 | 3.52 | 10.84 | 15.43 | 4.95 | 10.48 |

*Fig. 9C*

Holding Period: 3 Years

| | | | | | | |
|---|---|---|---|---|---|---|
| With No Recognition of Front End Loads | 36 Months | 16.00 | 0.23 | 15.77 | 20.36 | 0.40 | 19.96 |
| | 60 Months | 15.69 | 0.14 | 15.55 | 18.10 | 0.26 | 17.84 |
| | 84 Months | 18.62 | 0.10 | 18.52 | 18.85 | 0.26 | 18.59 |
| Recognizing Front-End Loads | 36 Months | 14.81 | 0.29 | 14.52 | 18.10 | 0.50 | 17.60 |
| | 60 Months | 14.52 | 0.17 | 14.35 | 15.89 | 0.43 | 15.46 |
| | 84 Months | 17.42 | 0.12 | 17.30 | 16.63 | 0.46 | 16.17 |

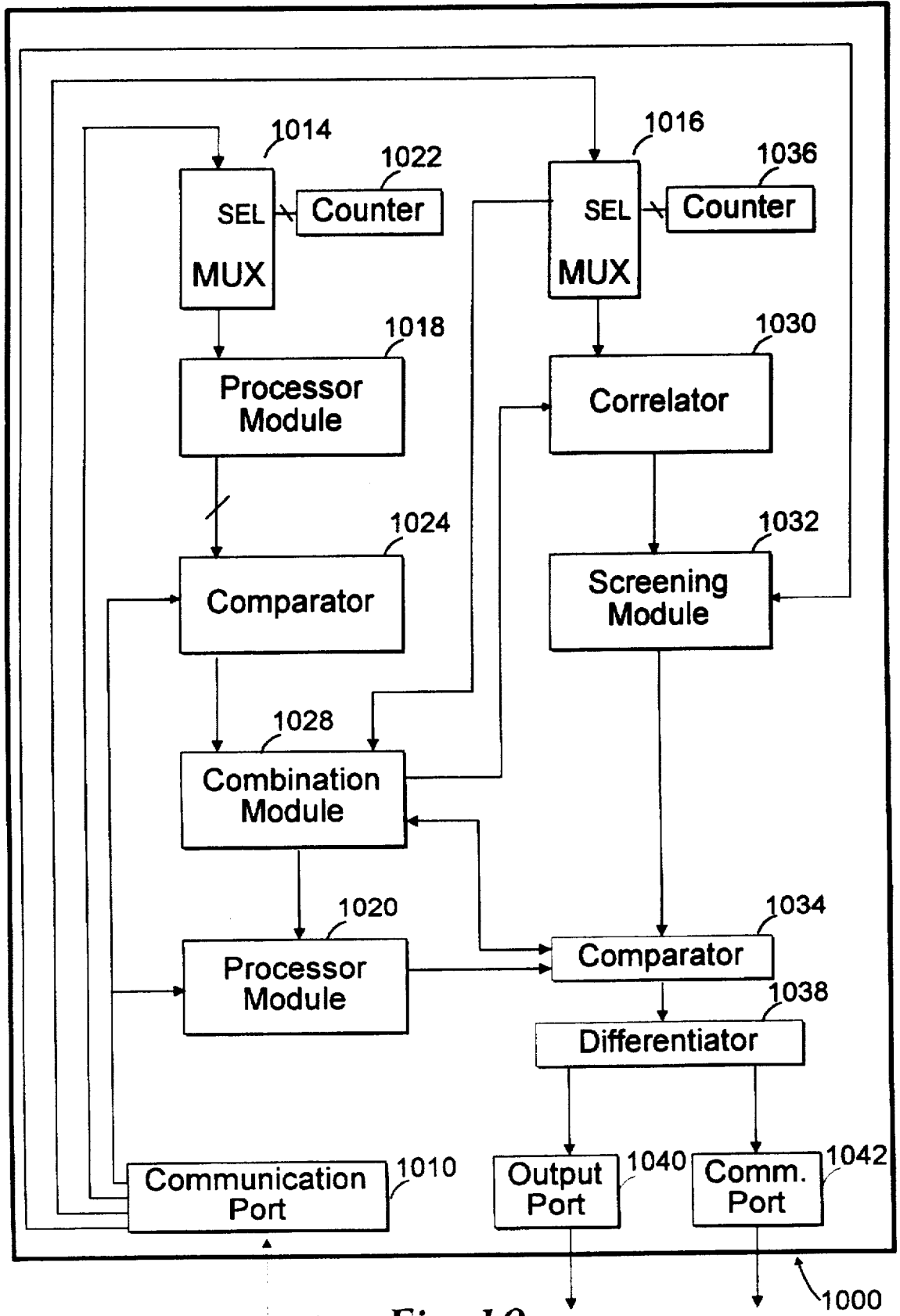
(from 50) *Fig. 10*

METHODS AND APPARATUS FOR FACILITATING EXECUTION OF ASSET TRADES BASED ON NONNEGATIVE INVESTMENT RISK, USING OVERLAPPING TIME PERIODS

BACKGROUND OF THE INVENTION

This invention relates to methods and apparatus for evaluating portfolios based on the risk and risk-adjusted return of investments.

Traditionally, investing has been difficult for the typical individual investor, particularly when the investor wishes to invest in a number of different investments for purposes of diversification but has a limited amount of funds to invest. The problem is exacerbated by the fact that most individual investors have neither the understanding nor the resources to properly measure the risk and return of investments.

Considering investment in stocks as illustrative of the general problem posed above, the advent of stock mutual funds in recent years has made it substantially easier for the individual investor to achieve the goal of diversification on a limited budget. The fact that a fund manager assumes the responsibility, which would otherwise be the investor's, of researching and trading the stocks of individual companies has contributed significantly to the widespread popularity of mutual funds as a convenient vehicle for investing in the stock market.

Nonetheless, since the nature of mutual funds varies from fund to fund, the individual investor still faces the problem of evaluating and comparing the various funds available for investment, particularly from the standpoint of return and risk. For example, one fund may be managed more aggressively than other funds, and for this reason might be considered more (or less) desirable for the investor. Accordingly, a fully understandable method for appropriately measuring the returns and risks of individual mutual funds, and thereby aiding in their selection, is needed by individual investors.

It is desirable, at the outset, to clarify the meaning of two key terms which are important to any understanding of this subject—"risk" and "volatility". They are often used interchangeably, even though they really represent very different basic concepts:

The term "risk" in general common usage means the possibility of an undesired event, generally as a result of random forces. It represents the taking of adverse chances; and implies a threat of loss of one's life, health, property or the like.

Investment risk and investment volatility are two different concepts which should be distinguished:

Investment risk is strictly downside, relating to the possibility of loss, underperformance, or shortfall, as defined in each circumstance.

Investment volatility is variability, both upside and downside. Although there may be some relationship between these two different concepts, it cannot be a simple one, as illustrated by the following example of two hypothetical investment funds:

| | Monthly Rate of Total Return - % | | | | | | |
|---|---|---|---|---|---|---|---|
| Month | 1 | 2 | 3 | 4 | 5 | 6 | Etc. |
| Fund A | 1.0 | 1.5 | 0.5 | 2.0 | 0.0 | 3.0 | ... |
| Fund B | 0.5 | 0.75 | 0.0 | 0.5 | 0.0 | 0.75 | ... |

In each month, the Fund A return is at least equal to the Fund B return, and in most months it is substantially higher than the Fund B return; but in no sense does Fund A indicate a greater risk than Fund B, even though it is clearly more volatile than Fund B: Fund A additional volatility is all on the upside, which poses no risk.

For individual investors, as well as for institutional investors, investment risk is a measure of the likelihood and the extent of underperforming a preestablished standard, or target rate of total return. Mathematically, that can be represented by the expectation of underperformance (the sum of products of (a) the likelihood of each event of underperformance and (b) the extent of underperformance in each event, a concept very similar to the much better known expression "expectation of life").

Essentially two methods of measuring investment risk are in current use.

(1) The Modern Portfolio Theory (MPT) Method. It is a cornerstone of Modern Portfolio Theory, which is based on the pioneering work of Harry Markowitz (in 1952) and William F. Sharpe (in 1963), who shared the 1990 Nobel Prize in Economics for that work. The variability of monthly returns over a short period, like 3–5 years, is indicated by the statistical measure known as the standard deviation (the square root of the mean of the squares of the differences between each monthly return and the mean of all monthly returns in the period). Under this method, the riskiness of a fund is indicated by dividing (1) the standard deviation so determined for the fund, by (2) the comparable standard deviation for a market index (such as the S&P 500, for Stock Funds, and the Lehman Aggregate Bond Index, for Bond Funds, or sometimes an index composed 50% of each of these 2 indexes, to provide wider comparability). The higher the result (which is sometimes referred to as $\beta$), the greater the "risk". The shortcomings of this approach are fundamental, for it:

(a) Measures only the variability of very short-term (monthly) returns, or volatility.

(b) Recognizes variability in returns in both directions, up and down.

(c) Compares the short-term variability in returns of a fund with that of the corresponding stock market (or bond market or both).

(d) Does not recognize the potential impact of sales loads.

(e) Does not provide any way to recognize the potential impact on risk of taxes on the investor.

(f) Does not provide any way of comparing funds in different asset classes (e.g. stocks vs bonds).

(g) Does not measure investment loss at all, which we believe is the essential meaning of investment risk.

(h) Does not correspond to any other meaning of "risk" in the real world.

(i) Does not lend itself to development of an understandable measure of risk-adjusted return.

(j) Does not permit an investor to apply his personal loss-to-gain aversion weight (explained below).

(k) Is not understandable by individual investors.

(2) The "Morningstar" Method. This was developed in about 1985 by Morningstar Inc., a Chicago financial publishing service, and is the other method of assessing risk in current use. In the original version of the method, a fund's risk-adjusted return is determined as follows:

First, the fund's total return, or "performance" over a specified analysis period is calculated, by determining the percentage increase in value over that period of an investment in the fund, including the result of prompt reinvestment in the fund of any distributions made available by the fund in the period. If, for example, the analysis period is five years, from Oct. 31, 1989 to Oct. 31, 1994, the cumulative performance is computed by subtracting the value of the investment on Oct. 31, 1989 from its value on Oct. 31, 1994, and then dividing the result by the value of the investment on Oct. 31, 1989. The resulting number, i.e., the cumulative change in value, or "performance", is first annualized, and is then divided by the average of the corresponding annual rate of performance for the same period of all the funds included in the broad class of funds to which it belongs (e.g., stock funds, taxable bond funds, municipal bond funds, or hybrid funds), to yield a relative return statistic for the given 5-year period.

Next, the fund's risk, relative to a specified standard, or predetermined baseline rate of return, is calculated. The Morningstar method uses the three-month Treasury Bill ("T-Bill") rate as its standard baseline or "target" rate of return. Continuing with the example of a five year analysis period, two quantities are computed for each of the sixty calendar months that comprise the five year period: (1) the monthly percentage increase in the value of an investment in T-Bills (T-Bill monthly performance), and (2) the monthly percentage change in the value of an investment in the fund (fund monthly performance). Specifically, in the example indicated above, the performance of the T-Bills and the fund are calculated for November 1989, December 1989 and so on, up to October 1994, to yield two sets of sixty monthly performance numbers. Then, for each of the sixty months, the fund performance is subtracted from the T-Bill performance to yield the extent to which the fund underperformed the T-Bill (the "shortfall") during that month. If the resulting difference is negative, it is set to zero, so that, in effect it is assumed that the fund performance was equal to the T-Bill performance in such months, and no recognition is given to any excess of the fund performance over the T-Bill performance in such months. The resulting sum of sixty numbers, consisting of shortfalls and zeros, is divided by 60, to yield the average monthly shortfall, which is the risk statistic for the fund. This risk statistic is then divided by the average corresponding risk statistic for the broad class of funds to which it belongs (mentioned above) to yield the relative risk statistic for the fund.

The fund's relative risk-adjusted return for the analysis period is then determined by subtracting the fund's relative risk statistic from the fund's relative return statistic.

The Morningstar method properly undertakes to measure investment risk in terms of shortfall rather than merely any variability. However it suffers from a number of fundamental shortcomings.

First, measuring shortfall on a month-by month basis, but assuming a fund return equal to the T-Bill return for all months in which the fund did not underperform T-Bills, in effect bases its shortfall or risk calculation on the assumption that what is being analyzed are the results of 60 investments in the fund as well as in T-Bills, each of which is held for only one month. This is evident from the following example which emphasizes the importance, in measuring investment risk, of the concept of the investment holding period. The following Table shows the monthly rate of excess return (i.e. over the T-Bill rate) for 2 hypothetical funds:

| Month | Monthly Rate of Excess Return - % | | | | | | |
|---|---|---|---|---|---|---|---|
| | 1 | 2 | 3 | 4 | 5 | 6 | Etc. |
| Fund C | 2.0 | −0.2 | 3.0 | −0.4 | 4.0 | −0.6 | ... |
| Fund D | 1.0 | −0.1 | 1.5 | −0.2 | 2.0 | −0.3 | ... |

In each month, Fund C has double the Fund D rate of excess return. Measured by these rates, Fund C has twice the volatility of Fund D. But Fund C is riskier than Fund D only for an investment made for an even-numbered month and held for only that month. For any other investment, Fund C clearly indicates less risk as well as higher returns than Fund D. But the Morningstar method would consider Fund C as riskier than Fund D, as it would recognize the shortfalls in the even-numbered months, and, in effect, ignore the excess returns in the odd-numbered months. The ambiguity and confusion in the meaning and significance of the Morningstar method is evident in the following sentence, which is part of the explanation of the method that appears in the New York Times every Saturday: "The risk rating reflects downside volatility which is measured during months in which a Fund underperformed Treasury Bills." The one month investment duration hardly reflects the typical investment. By basing the calculation on multiple one-month periods, it fails completely to recognize the decreasing risk related to longer investment holding periods.

Second, the Morningstar return statistic is calculated on a different assumption than is used for the risk statistic. Although risk is calculated by averaging shortfall results based on 60 investments each held for only a single month, the return statistic is calculated on the assumption of a single investment held for a 60-month period. Subtracting two quantities determined on different assumptions as to the investment holding period is inconsistent and results in an intuitively unsatisfying measure for risk-adjusted return.

Third, the return statistic is measured on a basis that recognizes sales loads, but the risk statistic does not recognize sales loads—another inconsistency.

Fourth, the two statistics, for risk and return, are expressed in different "units" or "currencies" ("relative risk" and "relative return"). So the result of the subtraction is a "hash" quantity that does not correspond to any recognizable concept in the real world. This numerical result is not even disclosed; instead icons in the form of stars are used to characterize the "star rating" of a fund (from one to five) to indicate the "class" of risk-adjusted return to which the fund belongs.

Fifth, the return statistic is based on a single observation, of the entire analysis period (in the example above, from Oct. 31, 1989 to Oct. 31, 1994); it is therefore inherently unstable.

Sixth, effective at the end of April 1994, the Morningstar method was revised, to change the return statistic. Originally it was the ratio of the fund annual return for the entire analysis period (e.g. 5 years) to the corresponding average of the annual returns for the period of all funds in its class (all stock funds, etc.). In the revision, the numerator of the ratio became the excess of the fund return over the T-Bill return for the period; the denominator similarly became the excess of the average return of all funds in its class over the T-Bill return, but with a proviso: the resulting denominator cannot be less than the T-Bill return for the period. This is a further degree of abstraction, making understanding by the individual investor less possible.

Seventh, the Morningstar procedure, in some circumstances, obscures the possibility that a fund's highly superior return may more than offset its somewhat higher risk.

Eighth, this procedure does not lend itself to a comparable, sound method of developing risk-adjusted returns on a basis recognizing taxes on the investor.

Ninth, many investors wish to select a portfolio of mutual funds of different classes, including funds invested in stocks, taxable bonds, and municipal bonds, as well as combinations of all three. More specifically, investors often want to select funds which tend to "hedge" one another, i.e. that offset one another in such a way as to reduce the aggregate investment risk. For example, if one mutual fund has historically yielded somewhat higher returns during periods when another fund has performed poorly, their combination in such periods would have resulted in a hedged portfolio of funds with reduced risk. The Morningstar method does not permit the analysis of return, risk and risk-adjusted return for a portfolio comprising more than one class of mutual fund.

SUMMARY OF THE INVENTION

In view of the foregoing, it is an object of this invention to provide methods and apparatus for defining, measuring, and expressing investment results, including risk, that are fully and readily understandable by the individual investor and that provide a meaningful measure of risk-adjusted return which can be expressed in an understandable manner.

More specifically, it is an object of this invention to provide methods and apparatus that are based on a definition of risk as being the likelihood and extent of underperforming a preestablished standard of return; that recognize the significance, for investment risk, of the length of the investment holding period; and that measure returns and risks on a consistent basis.

It is another object of this invention to provide methods and apparatus that are universally applicable, to all asset classes and funds, on a uniform basis.

It is also an object of this invention to provide methods and apparatus that recognize the impact of sales loads, where applicable, on both returns and risks, in a consistent manner. This includes methods and apparatus to evaluate the impact on risks and risk-adjusted returns of different schedules of sales loads available for the same net investment results (the so-called "A", "B", "C", and "D" mutual funds).

It is a further object of this invention to provide methods and apparatus that recognize the impact of taxes payable by the investor on both returns and risks, in a consistent manner (required for sound evaluation of portfolios that include municipal bond funds and other mutual funds).

It is still another object of this invention to provide methods and apparatus that permit an individual investor to apply easily a personal loss-to-gain aversion weight in calculating risk-adjusted return.

It is a further object of this invention to provide methods and apparatus that accommodate custom-tailored analyses for individuals prescribing alternative target rates of return or variable loss-to-gain aversion weights that depend on the degree of the shortfall.

It is a still further object of this invention to provide methods and apparatus that assist in the selection of a portfolio of mutual funds from a given library of candidate funds, by optimizing the degree of indicated fidelity of the chosen funds to the investor's expressed preferences in terms of risk and risk-adjusted return, exhibited for a selected investment holding period in a given period of analysis.

These and other objects of the invention are accomplished by providing methods and apparatus for selecting from a library of assets an investment portfolio of one or more assets, the selection being based on asset value data for the assets, target value data for a target asset, and investor preference data reflecting the preferences of the investor or group of investors for whom the portfolio is being selected. The asset value data and the target value data provided to the system take the form of pairs of datapoints, with the datapoints in each pair being spaced apart by a time duration common to each of the pairs.

An asset, or a set of assets and their relative proportions, is selected from the library of assets to form a tentative investment portfolio. The average relative performance of the tentative portfolio is computed by first forming a weighted sum of the asset value data for the assets forming the tentative portfolio, resulting in portfolio value data in the form of pairs of datapoints. The weights used to form the sum correspond to the relative proportions of the assets in the tentative portfolio. Second, for each pair of portfolio data and target data, a performance of the tentative portfolio over the common time duration, as well as a nonnegative shortfall (defined to be the extent to which the tentative portfolio underperforms the target asset over the common time duration), are calculated. The performances are averaged, as are the shortfalls. Subtracting the latter from the former yields the average risk-adjusted return of the tentative portfolio (assuming a loss-to-gain aversion weight of 1.0).

The performance of the tentative portfolio is compared to criteria derived from the investor preference data. If the criteria are satisfied, the tentative portfolio is designated as the investment portfolio. If not, a new tentative portfolio is selected and the processing sequence is repeated in an iterative manner until the criteria derived from the investor preference data are satisfied. The designated investment portfolio is then communicated to the investor.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 2 is a table showing one form that mutual fund data may take;

FIG. 3 is a table showing one form that target rate data may take;

FIGS. 6A, 6B, 6C, 6D, 6E, 6F, and 6G (collectively, "FIG. 6") are a representative printout of fund values, target rate values, and intermediate data from the computation of risk, return, and risk-adjusted return, calculated for a one-month holding period;

FIGS. 7A, 7B, 7C, 7D, 7E, 7F, and 7G (collectively, "FIG. 7") are a representative printout of fund values, target rate values, and intermediate data from the computation of risk, return, and risk-adjusted return, calculated for a one-year holding period;

FIGS. 8A, 8B, 8C, 8D, 8E, 8F, and 8G (collectively, "FIG. 8") are a representative printout of fund values, target rate values, and intermediate data from the computation of risk, return, and risk-adjusted return, calculated for a three-year holding period;

FIGS. 9A, 9B, and 89C (collectively, "FIG. 9") are a Summary of the results of the application of the system to 3 mutual funds, in each case for 3 holding periods: one month, one year and three years; and FIG. 10 is a schematic view of a second preferred embodiment of a system according to the present invention.

DETAILED DESCRIPTION OF THE INVENTION

Figure 1:
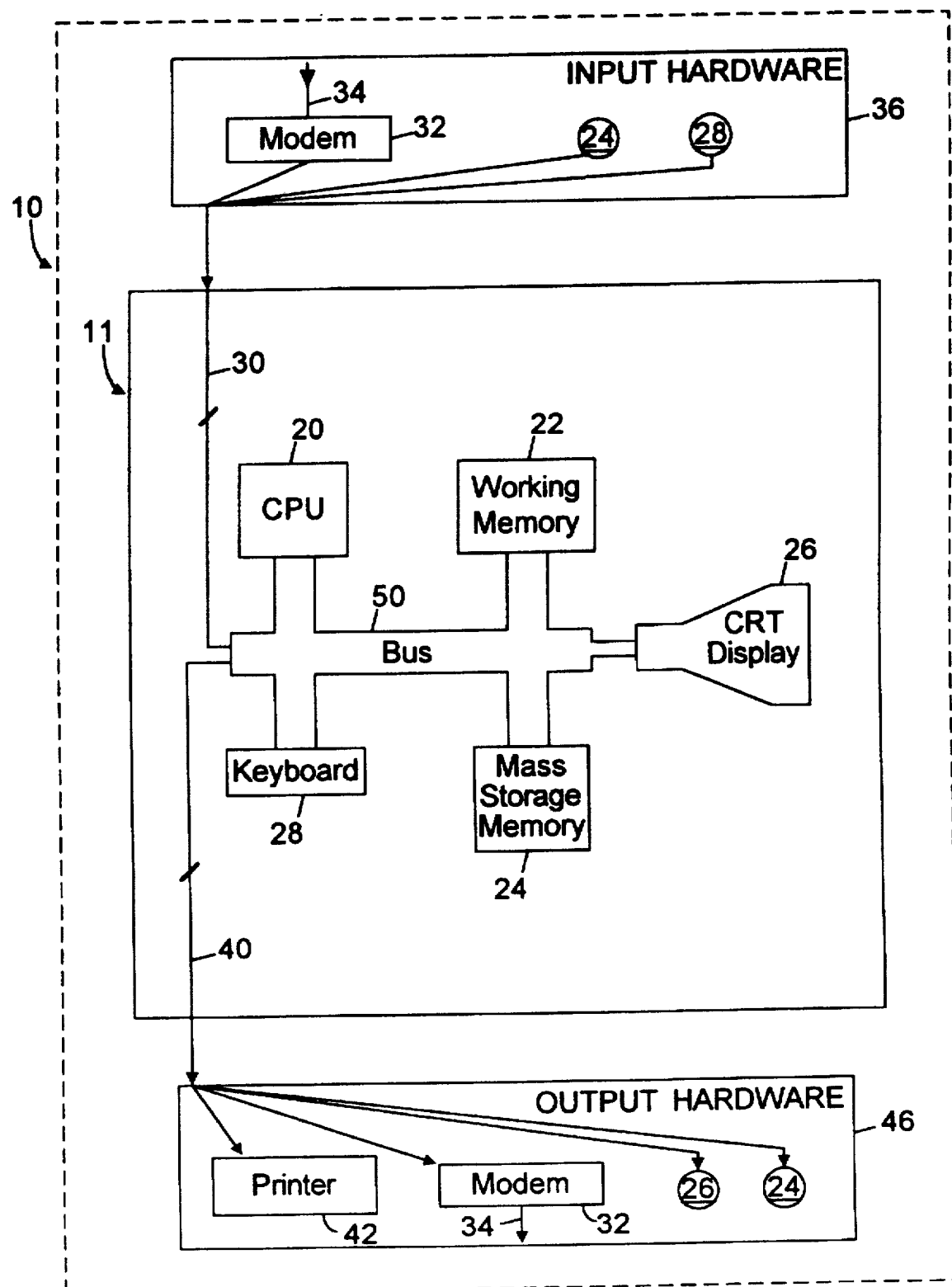
FIG. 1 is a schematic view of a first preferred embodiment of a hardware system according to the present invention.

The methods and apparatus of the invention can be readily applied to all types of investment for which market values and liquidation facilities are available on a regular, periodic basis, including individual securities, mutual funds of all kinds, as well as closed-end funds, variable annuities, commodity funds, separate accounts, commingled funds, and any portfolio consisting of a combination of these. To simplify the terminology in the following discussion, it is assumed that all investments are mutual funds.

The invention provides that the term "risk" means the likelihood and the extent of shortfall, i.e. of underperforming a preestablished standard level of return, which may be called the baseline asset or target rate of return. In general, there is broad flexibility in setting the standard level, which may be set on any basis by the investor. A generally useful target rate for most investors is the rate of a completely risk-free investment in the currency of the investor, which, for a U.S. investor, would be the contemporaneous rate on 3 month U.S. Treasury Bills ("T-Bills"). Accordingly, the T-Bill rate is used for illustration in the description that follows. (However, for a less risk-averse investor who may be willing to tolerate greater risk in seeking larger returns, the target rate may be a zero percent return or even a negative return. Alternatively, for more risk-averse investors, the target rate may be a fixed or variable rate substantially higher than the T-Bill rate.)

To measure risk on this basis, it is particularly preferable to follow a probabilistic approach, using rolling periods of uniform length, representing the assumed duration of the investment holding period, which should reflect durations representative of typical investor behavior. Shown as examples only in the description below are results for assumed investment holding periods of 1 month, 1 year, and 3 years (other periods should also be considered but are not shown).

To obtain a measure of returns to which the measure of risk can be related, the returns of an investment are measured on substantially exactly the same probabilistic basis used for measuring risks or shortfall.

In the description which follows, the basic annual risk-adjusted rate of return is defined as the average annual unadjusted rate of return reduced by the average annual rate of shortfall. Accordingly, it is expressed in the same "currency" (i.e. annual rate of return) as the unadjusted annual rate of return. This basic measure incorporates the proposed standard loss-to-gain aversion weight of 1.0, which means that it accords with the findings of behavioral economists that, in general, to individuals, a potential loss of $1 fully offsets an equally likely potential gain of $2, which is the basis used in the material which follows. Other loss-to-gain aversion weights may, of course, be used, as discussed below.

As indicated above, this method is completely self-contained, and does not require any reference to external data, such as results for market indices.

In accordance with the invention, substantially the exact same procedure is followed for all kinds of mutual funds (as well as other investments for which market values and liquidation facilities are available on a regular periodic basis) making it universally applicable across different asset classes, and thus suitable for risk analysis of portfolios including different asset classes.

The invention can be readily applied to recognize the impact of sales loads, in a consistent manner, on both returns and risks, as well as on risk-adjusted returns. In the detailed analysis of a single mutual fund which is exhibited in FIGS. 6-8 (discussed in more detail below), the impact of sales load is recognized. However, even for mutual funds with a sales load, an analysis which does not recognize sales loads conveys useful information to some investors, such as an investor who may be exempt from the sales load (e.g., an employee of the fund manager), or an investor who has already absorbed the sales load but is uncertain whether to retain the existing investment in the fund. Accordingly in FIGS. 6-8, as well as in FIG. 9, which summarizes the results of analysis for three mutual funds, results are shown both without and with recognition of sales loads, thereby illustrating the significance of recognizing sales loads for the purpose of measuring returns, risks, and risk-adjusted returns.

In recent years, some mutual fund organizations have made available so-called "A", "B", "C", and "D" funds, for which the same underlying assets are made available with different sales loads, including front-end, back-end, and 12b-1 fees. The invention can be readily applied to compare the risks and risk-adjusted returns of each of such arrangements.

The invention also can be readily adapted to recognize the impact of federal income taxes payable by the investor, and to express the results in a format which is consistent with the format for results which do not recognize such taxes. Such an adaptation is required for sound evaluation of the risk and risk-adjusted returns of portfolios which include municipal bond funds as well as other mutual funds. (The required adaptation is described below, but not the results.)

The preferred method of the invention is as follows:

It is particularly preferable to make a significant number of observations of the performance of the investment, on a consistent basis, since the only way to measure investment risk is on a probabilistic basis. Accordingly, a fund investment record is studied by dividing the total record of the period studied into "rolling periods", or segments (which are generally overlapping), each of a length in time equal to the fixed investment holding period being examined (e.g., 1 month, 1 year, or 3 years) and each ending with a month in the analysis period.

The segmenting is achieved by identifying pairs of fund value observations (i.e., pairs of "datapoints") and pairs of target value observations, or datapoints, that correspond to pairs of calendar dates (when the stock exchanges were open) spaced one holding period apart, i.e., spanning the segment. For each segment, or equivalently for each such pair of dates, the performance of the fund over the time spanned is computed by calculating the percentage change from the first fund value datapoint to the second fund value datapoint in the pair. Next, if the holding period is greater than one year, the fund performance is annualized. If the holding period is less than one year, the annualization step is performed later. (If the holding period is exactly one year, then the performance is already annualized.) Finally, the performance is adjusted to account for the fund's sales load, if one exists, with the sales load adjustment percentage being annualized beforehand if the holding period is greater than one year.

A similar computation yields the performances of the target asset over the same segments. Specifically, the performance across the pair of target rate datapoints defining each segment is computed by subtracting and dividing in exactly the same manner as described above for the fund value datapoints, as is the holding-period-dependent annualization step. However, sales loads are not taken into account, since the typical target asset (e.g., T-Bills) does not have a sales load.

The load-adjusted fund performance is subtracted from the target performance (with any negative result being reset to zero), to yield the nonnegative load-adjusted "shortfall", or extent to which the fund was outperformed by the target asset. The load-adjusted fund performances and shortfalls for each of the segments are then averaged, to yield the average load-adjusted return E(1) and the average load-adjusted shortfall E(2). The risk-adjusted return is then computed by performing the following weighted subtraction:

$$E(1) - W \times E(2)$$

where W represents the investor's loss-to-gain aversion weight. (For purposes of the remaining description, it is assumed that W=1.0.) If the holding period is less than one year, the risk-adjusted return so determined is annualized to yield the annual risk-adjusted return of the fund.

The following example of a specific application of the invention, which is helpful in providing a detailed description of the invention, is based on a number of specified conditions. It is evident that many other applications of the invention can be designed, based on other specified conditions, and the procedure modified accordingly within the scope of the invention. The specified conditions of the example that follows are that the analysis should:

1. Be applied to three different mutual funds (chosen were the Mathers Fund, the Fidelity Magellan® Fund, and the AIM Constellation Fund; the Mathers Fund is no-load; the other two have sales loads. Full details of the application are shown only for the Fidelity Magellan® Fund in FIGS. 6–8; a Summary of the results for all three funds is shown in FIG. 9);
2. Be applied to each fund on the basis of three different investment holding periods (to indicate the fundamental significance of the investment holding period for the measurement of risk): 1 month, 1 year and 3 years. (The 1 month holding period is analyzed not because it is considered a typical investment holding period, but because the two methods of measuring investment risk which are in current use, as described above, are based—improperly, according to the present invention—on an analysis of monthly returns.);
3. Be applied both (a) without recognizing sales loads, and (b) recognizing sales loads;
4. Be based on 84 observations for each holding period; and
5. Include observations ending with the end of the last business day of each month, beginning with July 1986 and terminating with June 1993.

The preferred system and method of the invention are now described in detail in connection with the accompanying Figures.

The present invention may be implemented on a variety of computer systems—ranging from a modest personal computer (such as those based on the 80×86 series of microprocessors originally developed by Intel Corporation, of Santa Clara, Calif.) equipped with a spreadsheet program such as LOTUS® 1-2-3 (available from Lotus Development Corporation, of Cambridge, Mass.), if the risk-adjusted returns for a small handful of mutual funds are to be determined, to a supercomputer, if an investment portfolio is to be created from a library comprising thousands of funds. (As of 1995, over 7,000 mutual funds were available in the U.S.) An exemplary computer hardware system 10 on which the present invention may be implemented is shown in FIG. 1.

In FIG. 1, which shows a first preferred embodiment of apparatus according to the invention, system 10 includes a computer 11 comprising a central processing unit ("CPU") 20, a working memory 22 which may be, e.g. RAM (random-access memory) or "core" memory, mass storage memory 24 (such as one or more disk drives or CD-ROMs), one or more cathode-ray tube ("CRT") display terminals 26, one or more keyboards 28, one or more input lines 30, and one or more output lines 40, all of which are interconnected by a conventional bidirectional system bus 50.

Input hardware 36, coupled to computer 11 by input lines 30, may be implemented in a variety of ways. Asset value data may be inputted via the use of a modem or modems 32 connected by a telephone line or dedicated data line 34 to an online financial service. Alternatively or additionally, the input hardware 30 may comprise CD-ROMs or disk drives 24. In conjunction with display terminal 26, keyboard 28 may also be used as an input device, in order to input investor preference data, for example.

Output hardware 46, coupled to computer 11 by output lines 40, may similarly be implemented by conventional devices. By way of example, output hardware 46 may include display terminal 26 for displaying the risk-adjusted performance of a fund or the selected investment portfolio. Output hardware might also include a printer 42, so that hard copy output may be produced, or a disk drive 24, to store system output for later use. Where asset trades are to be executed based on an investment recommendation, the trading information may be transmitted over telephone or dedicated data lines 34, possibly with the use of modem 32, to cause the trades to be executed.

In operation, CPU 20 coordinates the use of the various input and output devices 36, 46, coordinates data accesses from mass memory 24 and accesses to and from working memory 22, and determines the sequence of data processing steps. Specific references to components of the hardware system 10 are included as appropriate throughout the following description of the processing steps carried out by the hardware system.

Figure 5A:
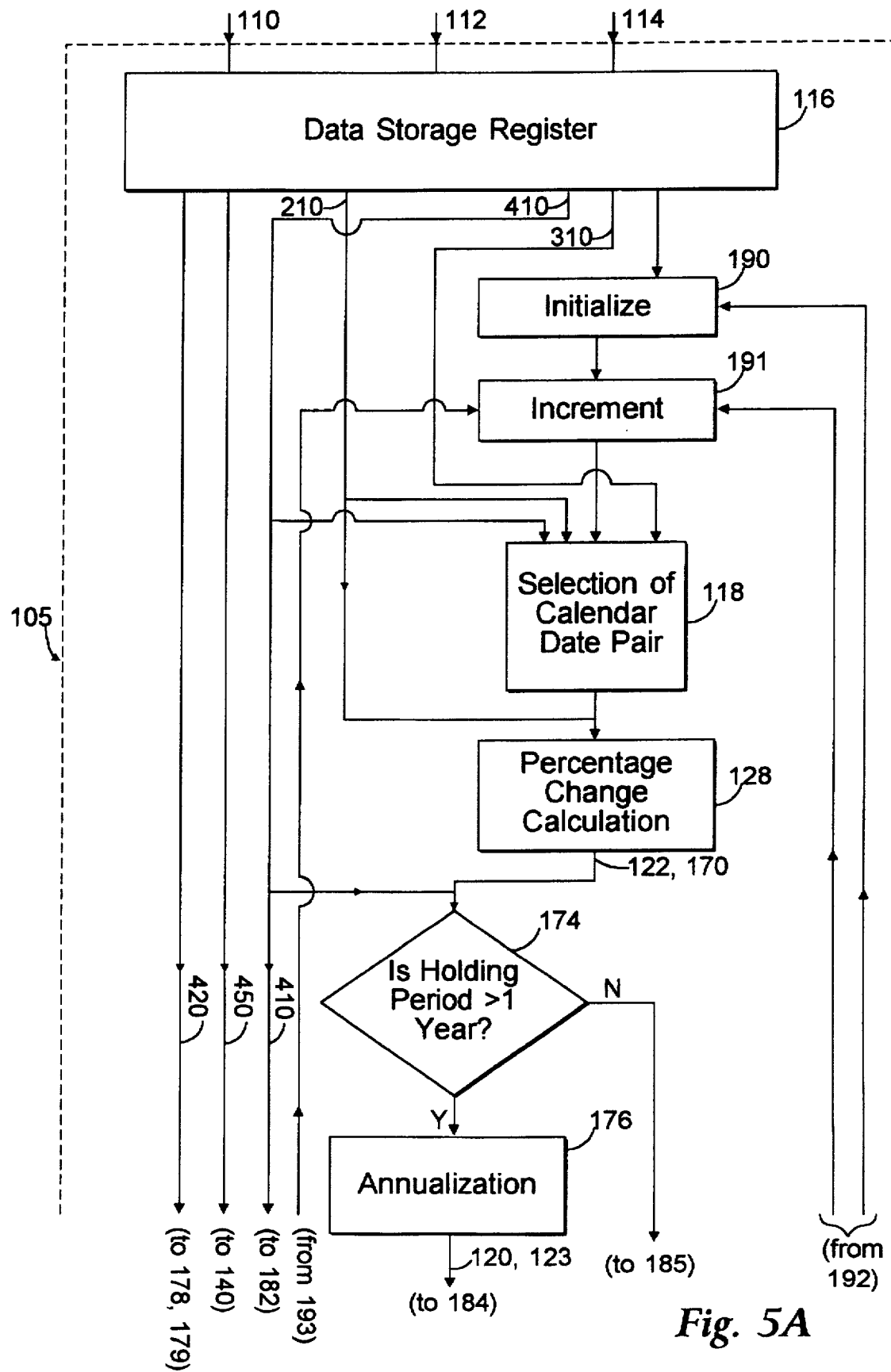
FIG. 5A, 5B, and 5C (collectively, "FIG. 5") are a flow diagram of the core processing method of the system.
Figure 5B:
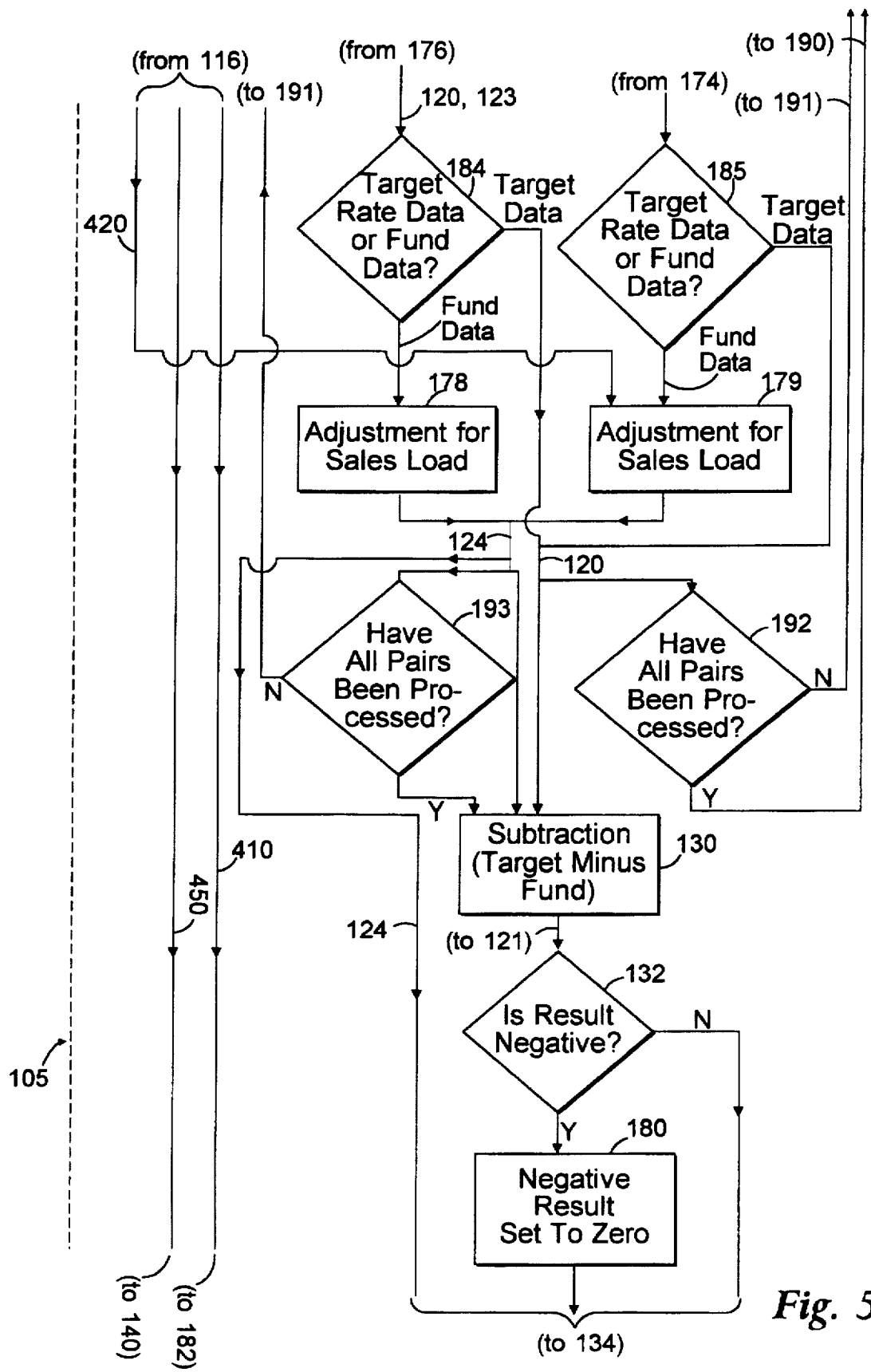
Figure 5C:
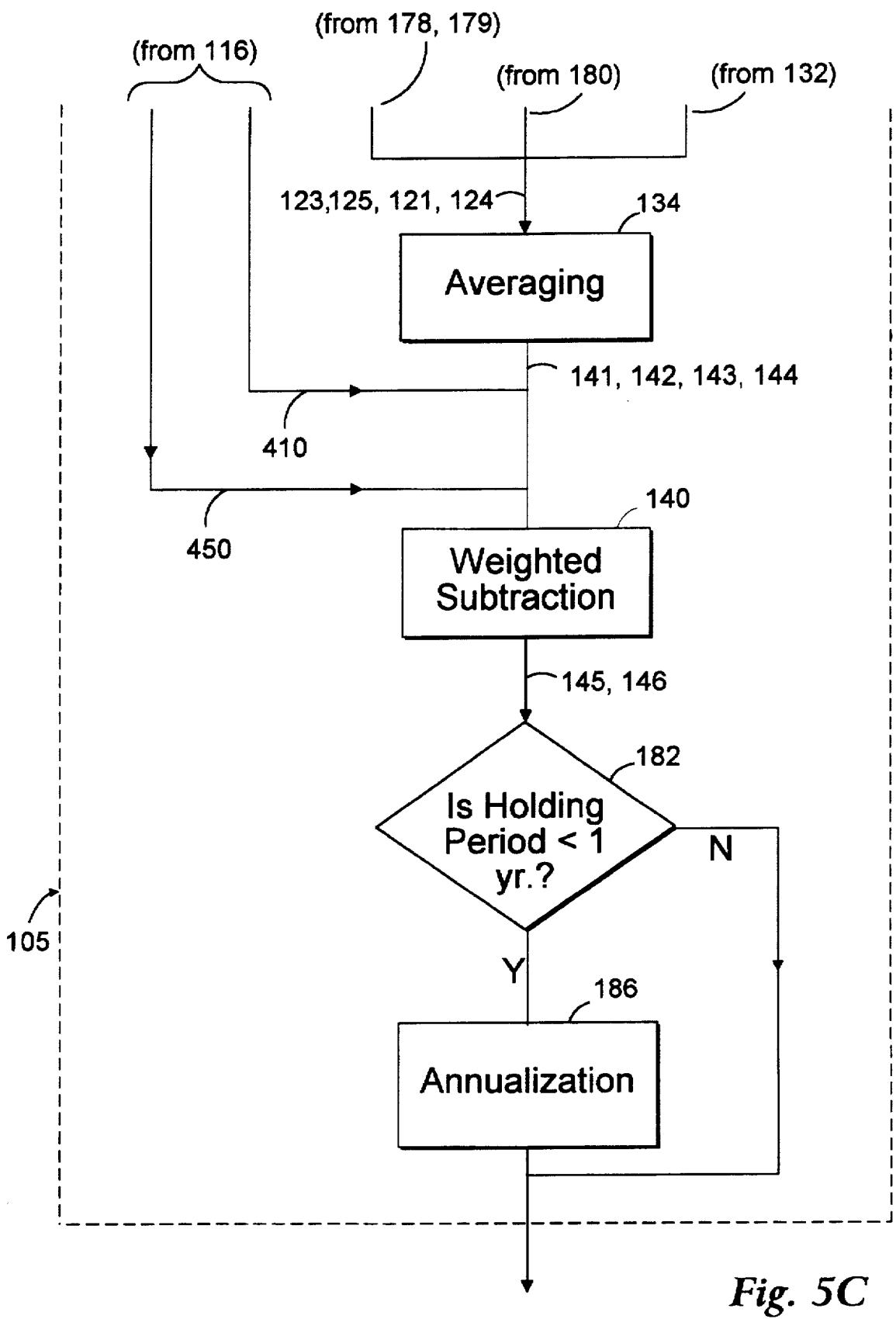

A flow diagram of a routine for computing the return, risk and risk-adjusted return of a mutual fund is provided in FIG. 5, and printouts of the application of the routine to a specific mutual fund history is shown in FIGS. 6–8. A Summary of the results of the application of the system to 3 mutual funds is shown in FIG. 9.

Referring to FIGS. 1 and 5, at step 110, CPU 20 receives as input over bus 50 data 210 corresponding to the candidate mutual funds to be processed. Data 210 is received by bus 50 either from modem 32 connected to an online service, or from storage memory 24. To measure investment performance for a period ending with any month requires a "look-back" procedure, to determine the starting date for the investment holding period. Accordingly, in view of specified conditions 2, 4 and 5, to measure the results of a 3-year holding period ending with July 1986, it is necessary to obtain data going back 3 years earlier, to 1983.

FIG. 2 illustrates one form that the mutual fund data 210 may take. In FIG. 2 columns 220 and 230 respectively represent (1) a series of calendar months 220; and (2) an index of the then current accumulated net asset values ("values") 230 of an investment previously made in a mutual fund, including the result of promptly reinvesting in the fund any distributions made by the fund. As with any series of index values, it is their relative values, and not their absolute values that have meaning. The calendar months in column 220 represent the end of the last day in that month on which the stock exchanges were open. Calendar months 220 and fund values 230 are also shown, respectively, in the third and sixth columns of FIGS. 6 and 7, and in the third and seventh columns of FIG. 8.

Optionally, the mutual fund data may be augmented to include additional columns of data (such as columns 240 and 250 of FIG. 2) for additional mutual funds.

Referring again to FIGS. 1 and 5, CPU 20 receives target rate value data 310 as input at step 112, again from modem 32 or mass storage memory 24, over bus 50. Target rate value data 310 are periodic data representing the accumulated value of an investment to be used as a preestablished standard, baseline or target of performance, below which fund results will be considered underperformance or shortfall. As indicated above, in this presentation, the target rate accumulated value represents investment in the contemporaneous rate on 3-month Treasury bills ("T-Bills").

FIG. 3 shows the same calendar months 220 as appear in fund data 210, as well as the corresponding accumulated values 330 on such dates of an investment previously made and periodically rolled over in 3-month T-Bills. Target rate values are also shown in the fourth column of FIGS. 6–8.

Both the mutual fund value data 210 and the target rate value data 310 are readily available from a number of public sources, including electronic on-line financial services such as Bloomberg, Reuters and Dow Jones Telerate, as well as in other formats from financial services such as Lipper Analytical Services and Morningstar. Some or all the data 210 and 310 may also be available in CD-ROM format.

Figure 4:
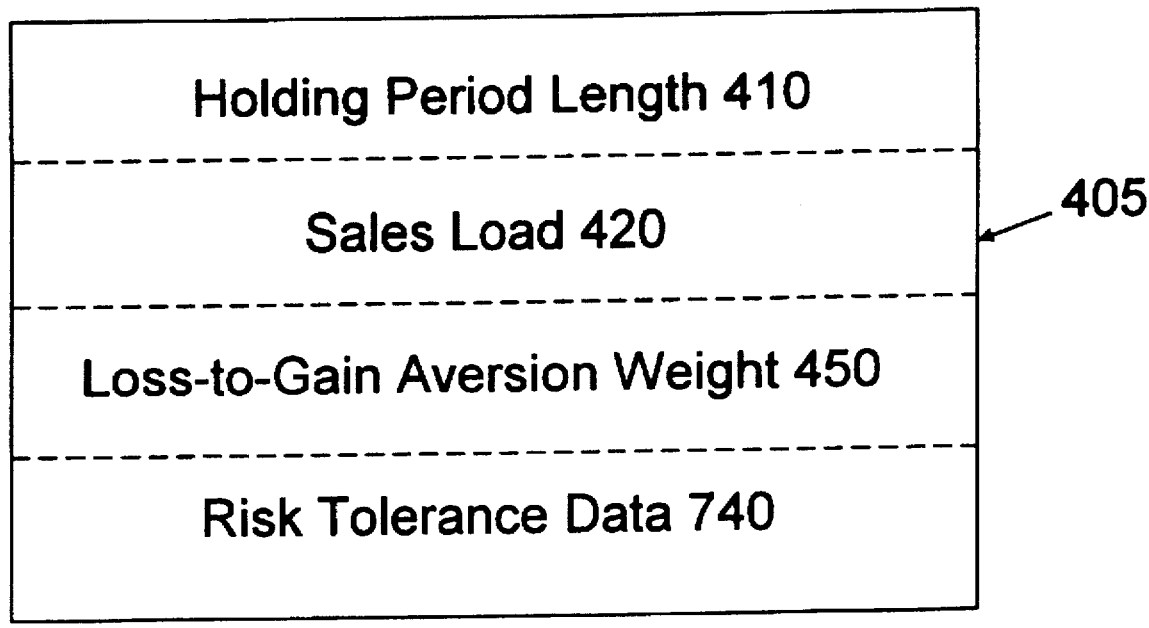
FIG. 4 is a table showing one form that additional "static" information, including sales loads, if any, as well as investor preference indications may take.

Referring back to FIGS. 1 and 5, a variety of other static data 405 are received by CPU 20 at input step 114. As shown in FIG. 4, data 405 include sales load amount 420 for each fund appearing in the fund data 210 (including both front-end sales load and contingent deferred sales load, if any), holding period length 410, loss-to-gain aversion weight 450 (explained below) and any additional risk tolerance data 740. The holding period length 410 is the length of time that a mutual fund investment is assumed to be held, before it is sold. Static data 405 are received by CPU 20 from mass storage memory 24 or keyboard 28, over bus 50.

To ensure proper operation of the system 10, the analysis period should be chosen so that it is long enough, on the one hand, to cover enough "observations" (i.e., an investment purchased on a "starting date", held for a "holding period" and sold on an "ending date") that the system can produce reliable output, but short enough, on the other hand, to avoid basing the output on information that is so old that it may no longer be relevant; and to ensure that more recently introduced funds, with shorter histories, can be processed by the system when they have been operating for a reasonable period.

In view of these considerations, it is suggested that at least 36 observations be made for each holding period, so that the minimum total period for which data would have to be available in mutual fund value data 210 and target rate value data 310 would be 36 months for a one-month holding period, 47 months for a one-year holding period and 71 months for a three-year holding period.

The data received by the system at input steps 110, 112, and 114 are stored by the system at storage register 116 in CPU 20, as shown in FIG. 5.

Continuing with FIG. 5, as the internal operation of the system proceeds, it is helpful to refer, periodically, to the printouts of the system in FIGS. 6–8, as well as to introduce notation which will assist in describing the processing of the basic data which has been stored in storage register 116. Specifically, the observation number of an entry in the printouts will appear as a subscript in the following description, so that, for example, "$310_{12}$" refers to the target rate value 310 that corresponds to the twelfth observation (see column (2)) in the printouts. Likewise, "Cs" refers to the change percentage "C" (defined below) that corresponds to the eighth observation.

At step 190, in FIG. 5, CPU 20 initializes to zero an index variable "E", representing the observation currently being processed, which always represents the ending month of an investment holding period, and initially corresponds to observation number zero shown in col. 2 of FIGS. 6–8, to item number 36 shown in col. 1, as well as to June 1986 in col. 3. Index variable E is used primarily as a counter of the observations, which, according to the fourth specified condition, will go as high as 84.

At step 191, CPU 20 increments E by one, to observation 1, which corresponds to item No. 37 and July 1986. At step 118, CPU 20 determines, by a "look-back" procedure, the item number "S" which corresponds to the starting month for the holding period "P" (measured in months) which is to be analyzed. It is evident that S=E-P—i.e., the starting month must be P months earlier than the ending month. In FIG. 6, which analyzes a one-month holding period, the starting month is one month earlier than the ending month; in FIG. 7, it is 12 months earlier; and in FIG. 8, it is 36 months earlier.

At step 128, CPU 20 computes the change percentage for the target rate values 310, and the fund values 210, for each holding period, starting with the holding period which ends with the ending month for observation one (July '86) and terminating with the ending month for observation 84 (June '93). For example:

(1) In FIG. 6, the first one-month change percentage 170 for the target rate values 310 (col. 5) is determined as follows (wherein the notation 37(4), e.g., means the entry in col. 4 for item 37):

$$100\left[\frac{37(4)}{36(4)} - 1.00000\right] = 100\left[\frac{128.57250}{127.94556} - 1.00000\right]$$
$$= 100[1.00490 - 1.00000]$$
$$= 100[.0490]$$
$$= 0.49\%$$

(2) Similarly, the first one-month change percentage 122 for the fund values 210 (col. 7) is determined as:

$$100\left[\frac{37(6)}{36(6)} - 1.00000\right] = 100\left[\frac{170.04048}{182.19344} - 1.00000\right]$$
$$= 100[.93330 - 1.00000]$$
$$= 100[-.0667]$$
$$= -6.67\%$$

(3) In FIG. 7, the first 12-month change percentage 170 for the target rate values 310 (col. 5) is determined as:

$$100\left[\frac{37(4)}{25(4)} - 1.00000\right] = 100\left[\frac{128.57250}{120.23900} - 1.00000\right]$$

$$= 100[1.06930 - 1.00000]$$

$$= 100[.0693]$$

$$= 6.93\%$$

(4) And the first 12-month change percentage 122 for the fund values 210 (col. 7) is determined as:

$$100\left[\frac{37(6)}{25(6)} - 1.00000\right] = 100\left[\frac{170.04048}{120.43846} - 1.00000\right]$$

$$= 100[1.41184 - 1.00000]$$

$$= 100[.4118]$$

$$= 41.18\%$$

(5) In FIG. 8, the first 36-month change percentage 170 for the target rate values 310 (col. 5) is determined as:

$$100\left[\frac{37(4)}{1(4)} - 1.00000\right] = 100\left[\frac{128.57250}{100.76000} - 1.00000\right]$$

$$= 100[1.27602 - 1.00000]$$

$$= 100[.2760]$$

$$= 27.60\%$$

(6) And the first 36-month change percentage 170 for the fund values (col. 8) is determined as:

$$100\left[\frac{37(7)}{1(7)} - 1.00000\right] = 100\left[\frac{170.04048}{96.52956} - 1.00000\right]$$

$$= 100[1.76154 - 1.00000]$$

$$= 100[.7615]$$

$$= 76.15\%$$

At test 174, CPU 20 then determines whether or not the holding period 410 is greater than one year. If the holding period 410 is greater than one year, change percentage 170 (denoted by $C_E$ below, for convenience) is routed by CPU 20 to annualization step 176, where it is annualized according to the following formula:

Annualized change % $120_E = (C_E + 1.00000)^{12/P} - 1.00000$ where P represents the holding period 410 expressed in months. CPU 20 then tests at step 184 to see whether the value data being processed is fund value data 210 or target rate value data 310. If the data is fund value data, then CPU 20 resumes processing at step 178, as described below. If the data is target value data 310, annualized change percentage $120_E$ is diverted to subtraction 130, skipping step 178. (Annualized change percentage 120 appears in the sixth column of FIG. 8.)

If, on the other hand, the holding period 410 is determined at test 174 to be less than or equal to one year and test 185 determines that the data being processed is target value data 310, CPU 20 routes change percentage 170 directly to subtraction step 130, skipping step 179. (If the holding period is less than one year, the annualization step is performed later; see below.) And if the holding period is exactly one year, the change percentage 170 is already annualized. Change percentage 170 is now called annualized change percentage 120, the modification in reference numeral made for consistency with any other annualized change percentage 120.

At test 192, CPU 20 checks whether E=84, which condition if true indicates that all 84 observations have been made. If E is determined by test 192 to equal 84, CPU 20 begins processing of the fund data 210 at step 190.

If E is determined to be less than 84, CPU 20 repeats the same processing sequence at steps 191, 118, 128, 174, 176, 184, 185, 192 for successive pairs of data points (each pair spaced one holding period apart) of target values 330, as index variable (observation) E is incremented at step 191 over the integers 1 to 84. Specifically, at step 128, value $330_S$ is subtracted from value 330E and the result is divided by value $330_S$ to yield target data change percentage $170_E$. CPU 20 at step 176 then annualizes the result as described above if at test 174 the holding period 410 is determined to be greater than one year. Steps 191, 118, 128, 174, 176, 184, 185, 192 repeat this process until test 192 determines that the last scheduled ending month $220_E$ has been reached i.e. E=84. When test 192 so determines, CPU 20 resumes processing at step 190. (In an alternate embodiment, index variable E may be incremented more rapidly at step 191, so that the data are sampled more readily in time. For example, E may be incremented at step 190 by odd numbers 1, 3, 5, etc., to skip the data for all even numbered months.)

After index variable E has been reset to zero, at step 190 and incremented at step 191, the fund value data 210 and holding period 410 stored at register 116 are passed to month selection step 118 and then to subtraction and division step 128 in the same manner as target value data 330 were, thereby producing for each pair of fund values a fund change percentage 122. (Representative fund change percentages 122 are shown in col. 7 of FIGS. 6 and 7 and in col. 8 of FIG. 8.)

CPU 20 then proceeds to test 174 and determines whether the holding period 410 is greater than one year. If the holding period 410 is more than one year, fund change percentage 122 is annualized at step 176 in the same manner as target value data 310 was annualized at step 176, so that an annualized change percentage 123 is formed. After confirming at test 184 that the data being processed is fund value data 210 and not target value data 310, CPU 20 routes change percentage 123 to step 178 where sales load 420 (denoted "L" for notational convenience) if any, is taken into account. If at step 174, CPU 20 determines that the holding period 410 is one year or less (which applies to FIGS. 6 and 7) test 185 routes each fund change percentage 122 (denoted "C") to step 179, where sales load is accounted for by calculating a load-adjusted fund change percentage 124 (denoted "LAC"), by the following formula: LAC=(1.0000+C)×(1−L)−1.0000. In FIG. 6, for July 1986, e.g., LAC 124 (Col. 9) is determined as (1.0000−0.0667)×(1.0000−0.03)−1.0000 which becomes (0.9333)×(0.97)−1.0000=0.9053−1.0000=−9.47%.

If at step 174, CPU 20 determines that the holding period 410 is more than one year, which applies to FIG. 8, then LAC 124 is calculated at step 178 by the following formula:

$LAC=[(1.0000+C)\times(1-L)^{12/P}]-1.0000$ (where C denotes the annualized change percentage 123 without recognizing sales load). Here is an example of the first such entry in col. 11 of FIG. 8, for July 1986:

$LAC=[(1.0000+0.2077)\times(0.97)^{1/3}]-1.0000$, which becomes [(1.2077)×(0.9899)]−1.0000=1.1955−1.0000= 19.55%.

Load-adjusted change percentages 124 are then passed to both subtraction step 130 and averaging step 134. CPU 20 tests at step 193 whether all fund value data 230 have been processed, i.e. whether E=84. If E is found to be less than 84, then CPU 20 resumes processing at step 191; otherwise CPU 20 resumes processing at step 130. At step 130, CPU 20 subtracts change percentage $123_E$ from change percentage $120_E$, for all values of E from 1 to 84, with the results, if positive (as determined at step 132), designated $121B_E$, for shortfall not recognizing any sales load. These results appear in col. 8 of FIGS. 6 and 7 and col. 10 of FIG. 8). For a fund with a sales load, as is the case for FIGS. 6–8, CPU 20 at step 130 also subtracts LAC $124_E$ from change percentage 120E, for all values of E from 1 to 84, with the results, if positive (as determined at step 132), designated $125_E$ for load adjusted shortfall. (These results appear in col. 10 of FIG. 6 and 7 and col. 12 of FIG. 8.) The results are routed to step 134 where CPU 20 computes four totals: (1) the sum of fund change percentages 123; (2) the sum of load adjusted fund change percentages 124; (3) the sum of shortfalls 121; and (4) the sum of load-adjusted shortfalls 125. Each of the 4 sums is divided by the number of observations, in this case 84, to provide the average rates of return, with (141) and without (142) load adjustment, and of shortfall, also with (143) and without (144) load adjustment. In the case where the holding period 410 is at least one year, the average rates of return 141, 142, and of shortfall 143, 144, are annual rates. (These results appear on the final page of FIGS. 7–8, at the bottom of each corresponding column referred to above, below observation 84.) Where the holding period is less than one year, annualization has not been performed yet; see below.

Processing then continues at step 140. At subtraction step 140, CPU 20 retrieves loss-to-gain aversion weight 450 from register 116, which becomes the multiple to apply to the average rate of shortfall 144, with the product to be subtracted from the average rate of return 142, to produce the average rate of risk-adjusted return 146. The same is done for the corresponding load-adjusted quantities, i.e., CPU 20 forms a product of weight 450 and average rate of shortfall 143, and subtracts the product from average rate of return 141, to yield average rate of load-adjusted, risk-adjusted return 145.

The weighting at step 140 is performed to reflect the indication provided by behavioral economics that individuals are risk-averse and generally view a potential one dollar loss as completely offsetting a potential two dollar gain of the same likelihood. As observations which indicate a shortfall are already included in the average rate of return, subtracting the average rate of shortfall from the average rate of return (weight 450 equals 1.0) results in counting the shortfall twice, thereby comporting with the behavioral economics view of individual sensitivity to potential gain and loss. The more risk-averse the investor, the higher weight 450 should be set, and vice versa.

Finally, CPU 20 tests at step 182 whether the holding period is less than one year. If not, processing is diverted around step 186, since annualization has already been performed. If so, at step 186, the following quantities are annualized: average rates of risk-adjusted return 145, 146, using the following formula:

$$\text{Annualized rate} = (1.0000 + A)^{12/p} - 1.0000$$

where "p" is the holding period, expressed in months, and A is the corresponding average rate as measured for the duration of p months. (See bottom of FIG. 6D. p. 4.)

In the case where mutual fund data 210 include data from more than one mutual fund, the risk-adjusted performance for the additional mutual funds is calculated in precisely the same way by CPU 20 at steps 190, 191, 118, 128, 174, 176, 184, 178, 185, 179, 192, 130, 132, 180, 134, 182, 186, and 140. That is, mutual fund values 240 for the second mutual fund replace values 230 in each of the steps listed above to yield a risk-adjusted performance 144 for the second mutual fund. Indeed it will be clear to those skilled in the art that the same can be accomplished for any number of mutual funds, provided that the value data for each fund is included in fund data 210 and the sales load information for each fund is provided. It will also be clear that the system as described above, in which each mutual fund is processed sequentially, is merely illustrative, and that the processing can be done in other ways. For example, the processing of all of the mutual funds could be accomplished in parallel, with any number of tests as well as any number of selection, subtraction, and averaging steps, and the like connected in parallel.

The methods and apparatus described in detail above are completely appropriate only for an investment that is not subject to tax, as one held by a qualified pension plan or an otherwise tax-exempt investor. For taxable investors, the effect of federal income taxes paid by the investor may be assessed by the invention by replacing the fund data 230, 240, 250 and the target rate data 330 inputted into the system 100 by tax adjusted values for each ("tax-adjusted data"). As tax is payable by a taxable investor as long as he retains an investment only on taxable distributions made available by the investment, it is necessary to obtain a history of such distributions separated into: (1) tax-exempt interest, if any, on which no federal tax is payable; (2) taxable interest, dividends, and short-term capital gains, all of which in the U.S. are taxed as ordinary income, subject to a current maximum federal tax rate of 39.6%; and (3) long-term capital gains, subject to a current federal tax rate in the U.S. of 28%. For the target rate investment in 3-month T-Bills, the maximum tax rate in the U.S. is currently 39.6%. (It would not be practical, as a general matter, to also recognize individual state and local income taxes, although it would theoretically be possible, and it would be feasible to do so on customized analyses of assets of sufficient magnitude to warrant the additional expense.)

The methods and apparatus for evaluating portfolios based on tax-adjusted investment risk and risk-adjusted return, using such tax-adjusted data, would be exactly the same as has already been described for the procedures not recognizing taxes payable by the investor, with the following modifications required to recognize the impact of federal income taxation: (1) any taxable distributions would be reduced by federal taxes, with only the net amount applied for reinvestment; (2) the adjusted tax basis of the investment would include all amounts applied for reinvestment, in addition to the original investment; and (3) the net amount available upon termination of the investment, by sale or by inheritance, would be the gross proceeds reduced by any applicable federal taxes. (Of course, for consistency, the results for the target rate should also be tax-adjusted unless the target rate is based on a tax-exempt investment.) The format for expressing the results of the evaluation would be exactly the same as has already been described for evaluation not recognizing taxation, namely: (a) average annual rate of tax-adjusted return, minus (b) average annual rate of tax-adjusted shortfall, yielding (c) average annual rate of risk-adjusted, tax-adjusted return. All such results should also be load-adjusted, where appropriate.

Such a tax-adjusted procedure would be required, of course, to properly evaluate portfolios which hold municipal bond funds as well as other mutual funds.

At this point, it would be useful to point out the probabilistic nature of the approach followed by the invention in measuring risk or shortfall. FIG. 7, which analyzes a one-year holding period, shows the results of 84 observations, over a span of 7 years, for 12-month periods ending with months from July 1986 through June 1993. From col. 8, which does not recognize sales loads, it is evident that shortfalls occurred in 18, or 21.43%, of the observations. Also, it is evident from col. 8 that the sum of the 18 shortfalls is 243.33%, so the average shortfall, when it occurred, was $\frac{1}{18}$ of 243.33% or 13.52%. Accordingly, the likelihood of shortfall, 0.2143, multiplied by the average shortfall, when it occurred, of 13.52% is 2.90% which is the expectation of shortfall, or in less formal language, the average annual rate of shortfall, for the 84 observations. Recognizing sales loads, in col. 10, indicates 19 shortfalls (22.62%) and a sum of the shortfalls of 295.45%, indicating an average shortfall, when it occurs, of 295.45/19 or 15.55%. Accordingly, the expectation of shortfall increases to (0.2262)×(0.1555) or 3.52%, the average annual rate of shortfall.

FIG. 9 summarizes the analysis of three mutual funds— one no-load, and two with sales loads. Among the insights which the Summary offers are the following:

1. Sales loads reduce returns and may thereby increase risks, especially for short and very short holding periods.
2. A short-term investment in a relatively volatile fund, especially if it has a significant front-end load, is extremely risky, even for funds such as Fidelity Magellan and AIM Constellation, which show very fine average annual rates of load-adjusted, risk-adjusted return for holding periods of one year and 3 years, but, for a holding period of one month, show average annual rates of load-adjusted, risk-adjusted return ranging from −40.91% to −70.37%. (This insight is not even hinted at by either the Modern Portfolio Theory method or the Morningstar method of measuring investment risk.)
3. Even sound analyses of very short holding periods, like one month, do not reveal any useful information applicable to longer holding periods, like 3 years or even one year. In general, volatility and risk do not appear to be highly correlated, for sufficiently long holding periods.
4. For holding periods of 3 years, and even one year, the effect of sales loads on returns, including risk-adjusted returns, may be overwhelmed by net investment performance.
5. The average annual rates of return, shortfall and risk-adjusted return, for holding periods of one year or more, as indicated by the system for a sufficiently large number of observations, seem reasonably stable (although larger studies with longer histories and more funds would be desirable).
6. Where complete information is provided about the return and risk elements of risk-adjusted returns, as in the lower section of FIG. 9, it is very simple for an individual investor to apply a personal loss-to-gain aversion weight. For example, consider the load-adjusted return and risk elements for 84 observations of a one year holding period for the AIM Constellation Fund. Shown in FIG. 9 are an average annual return of 15.43%, reduced by an average annual rate of shortfall of 4.95%, resulting in an average annual load-adjusted, risk-adjusted return of 10.48%. This result, as has been explained above, reflects a loss-to-gain aversion weight of 1.0. A less risk-averse investor, who considers his personal loss-to-gain aversion weight to be only 0.5, should reduce the average annual rate of return (15.43%), by only half of the average annual rate of shortfall (4.95%), or by 2.475%, resulting in a personal annual load-adjusted, risk-adjusted rate of return of 12.955%.

It is a well known and well accepted truism that the past is not necessarily a predictor of the future, particularly for, but not limited to, financial matters. Some observers believe that the past is a better predictor of longer term trends than of shorter term. In any situation there is an excellent case to be made that reliance should not be based solely on the past, but that the implications of any retrospective analysis should be subjected to the influence of prospective views of the future. But no one would suggest that no consideration whatever should be given to the implications of past records. And therefore, for a balanced view, as the prospects of the future are always uncertain, it is useful to obtain the most reliable and informative analysis of the past.

The pioneering work of Harry Markowitz, in 1952, and William F. Sharpe, in 1963, in the development of what has become known as Modern Portfolio Theory (MPT) can properly be characterized as developing the quantitative analysis of investment volatility, or the variability of short-term results. Their work led to growing awareness of the nature of investment volatility and to interest in controlling such volatility, and especially to controlling variance from market results. Accordingly, the fathers of MPT are credited therefore with stimulating the development of index funds, which are now a major factor in individual and institutional investment in stocks and bonds, in the U.S. and abroad.

The versatility of the invention, in applying a probabilistic approach to measuring investment risk, as distinguished from volatility, to a wide variety of investments of different classes, on a uniform basis, is believed to offer a similar promise: to lead to the development of procedures to manage the risk of portfolios, by controlling the degree of longer-term shortfall, by either static or dynamic systems.

The invention includes, and can be applied to, the selection and optimization of a portfolio of mutual funds, as follows:

1. The client establishes the following objectives:
   A. The library of mutual funds from which the portfolio is to be selected consists solely of 12 index funds offered by The Vanguard Group, Inc.: (1) 6 U.S. Stock funds: Total Stock Market; SaP 500; Extended Market; Small Cap; Growth; Value; (2) 3 international stock funds: Europe; Pacific; Emerging Market; and (3) 3 U.S. Bond Funds: Total Bond Market; Intermediate Term Bonds; and Short Term Bonds. By using only Index Funds, the client is assured that the performance of each fund will exhibit absolute fidelity to its investment policy.
   B. The portfolio to be selected is to consist solely of 6 Index Funds in the weights resulting from the proportions fixed at the outset (i.e., on a static basis).
   C. The portfolio should be optimized to have provided the highest average risk-adjusted rate of return consistent with the risk limitations that (1) the maximum individual event of shortfall did not exceed 15% and (2) the likelihood of a shortfall of 10% did not exceed 5%, for a one-year holding period, as indicated by observations ending in the 84 months from July 1986 through June 1993, and with the target rate of return set at T-Bills, and the loss-to-gain aversion weight set at 1.0. (Aside from the additional risk limitations, these conditions are the same as those which apply to FIG. 7.)
2. For simplicity, this embodiment assumes that the client is either a tax-exempt entity, such as a pension fund, or is otherwise not interested in an analysis which recognizes taxes on the investor. Furthermore, for this purpose, let us assume that these 12 Vanguard funds do not have any sales loads or transaction fees.

3. The first step would be to prepare for each of the 12 funds a table like FIG. 7, but with an additional column 8A. Col. 8A would be similar to Col. 8 in FIG. 7 except that it would be equal to Col. 5 minus Col. 7 without the restriction that applies to Col. 8, namely that the entries must be either positive or zero. In other words, the entries in Col. 8A would be the unrestricted variance from the target rate and therefore could be positive, zero, or negative. Col. 8 would be used, as in FIG. 7, to determine the average annual shortfall of a fund; Col. 8A would be used to determine the likelihood that the experience of the variance of two funds might be sufficiently inversely correlated that their combination could result in lower average annual shortfall than one or both funds experienced individually, i.e. that they would hedge one another to some extent.

4. The correlation of the variance experience of two funds would be determined using the following formula:

$$r = \frac{\sum\limits_{1}^{N}(X_i - \bar{X})(Y_i - \bar{Y})}{\sqrt{\sum\limits_{1}^{N}(X_i - \bar{X})^2(Y_i - \bar{Y})^2}}$$

where $X_i$ and $Y_i$ are the corresponding variance entries in Col. 8A for two funds at observations for the same ending month, and $\bar{X}$ and $\bar{Y}$ are the averages, respectively of all variance entries in Col. (8A) for each of the two funds. In general, the lower the correlation of the variance of two funds, especially if it is negative, the greater is the likelihood that they would hedge one another to some extent.

5. The second step would be to determine which 10 of the stock funds should be considered the core stock fund. In view of the high percentage of the total capitalization of U.S. stocks which they represent, both the Total Stock Market fund and the S & P 500 fund are presumptively appropriate candidates to be the core stock fund for a U.S. investor. An examination of the average annual rate of risk-adjusted return of the two funds should indicate which one should be chosen (i.e. the one with the higher average risk-adjusted rate of return).

6. The third step would be to compute the correlation coefficient of the variance of the selected core fund with each of the remaining 4 U.S. stock funds.

7. By iteration, starting with the fund which has the lowest correlation with the core stock fund, there would be run the equivalent of 4 versions of the expanded FIG. 7 for an initial investment consisting of 50% of the core fund and 50% of each of the other 4 U.S. stock funds. Examination of the results would indicate for each combination, (a) the degree to which it complies with the risk limitations set by the client, (b) the average annual risk-adjusted return, (c) the degree of similarity to the results for other combinations. For example, the results for the combination with the Extended Market fund would be expected to be somewhat similar to the results with the Small Cap fund. In that case the choice indicated would be that combination with the better average risk-adjusted return, provided the risk limitations are met. In this way, funds would be eliminated, until the best two-fund U.S. stock combination is determined, with the two funds equally weighted at the outset.

8. Having found the best two-fund U.S. stock combination, the next step would be to determine, in a similar manner, which of the three international stock funds could produce the optimum three-fund stock combination with the two U.S. stock funds previously selected, with the three funds equally weighted at the outset.

9. After determining the best three-fund combination of stock funds, the next step would be to determine in a similar manner, which U.S. Bond fund could be added to determine the optimum four-fund combination with the three stock funds previously selected, with the four funds equally weighted at the outset.

10. In a similar manner, there would be determined a fourth stock fund and then a second bond fund, making a total of six funds.

11. With the six funds selected on an equally weighted basis, the next step would be, by iteration, to ascertain the optimum variable weighting of the six funds that produced the best average annual risk-adjusted return consistent with the risk limitations. This optimization might be performed by using standard local optimization techniques, such as gradient ascent or descent, to locate local maxima or minima.

12. After completion of the preceding analysis, it would be desirable to complement the results derived from the historical experience with any prospective views of the future that may seem appropriate, and run the experience of any revision of the selection and optimization of the portfolio, to observe the implications of the changes.

The foregoing description provides only a small number of examples of the use of the present invention to measure investment risk, or to select and optimize portfolios of mutual funds. Furthermore, as an alternative to implementing the invention by hardware that includes a general purpose computer, the invention may be implemented purely in hardware. For example, to implement the portfolio selector described above, CPU 20 shown in FIG. 1 could be replaced by a combination of hardware components as depicted in FIG. 10.

In FIG. 10, which shows a second preferred embodiment of apparatus according to the invention, the hardware combination 1000 which replaces CPU 20 includes a communication port 1010 for accessing fund value data 210 and target value data 310 from bus 50. Port 1010 feeds fund value data 210 corresponding to the first group into a multiplexer 1014, fund value data 210 corresponding to all remaining groups into another multiplexer 1016, value data 210 and 310 into processor modules 1018 and 1020, and investor preference data 740 into a screening module 1032.

Counter 1022, which counts from 1 to the number of assets in the first group, engages the select lines of multiplexer 1014 so that the multiplexer's output is fund data 210 for the selected fund. Processor module 1018 takes the output of multiplexer 1014, along with the target value data it received from port 1010, and computes an average risk-adjusted return for the selected fund. Counter 1022 continues counting until all funds in the first group have been processed by processor module 1018, at which point the risk-adjusted returns are outputted by processor module 1018 into a comparator 1024. Comparator 1024 chooses the fund in the first group having the highest risk-adjusted return, designates the fund as the tentative portfolio, and outputs the tentative portfolio to combination module 1028.

Next, in response to a second counter 1036, which counts from 2 to the number of groups in the library, multiplexer 1016 feeds the fund value data 210 for the selected group into a correlator 1030 and into combination module 1028. Fund data corresponding to the tentative portfolio is likewise routed to correlator 1030 from combination module 1028. Correlator 1030 computes a correlation of the variances of each fund and the variance of the tentative portfolio. Module 1028 combines the fund data 210 for each fund in the selected group with fund data corresponding to the tentative portfolio, with the combinations of fund data fed to a second processor module 1020, which computes the average risk-adjusted return for each combination.

The output from correlator 1030 is screened by module 1032, which determines which combinations have correlations that satisfy criteria derived from the investor preference data 740 received from bus 50 via communication port 1010. This determination, as well as the output computed by module 1020, is received by comparator 1034, which chooses the combination having the highest average risk-adjusted return from among those passing the screening performed by module 1032, designates the combination as the new tentative portfolio, and feeds the value data for the tentative portfolio back to combination module 1028. As counter 1036 increments, the tentative portfolio is augmented by additional funds in the manner described above, until the last group has been processed. The tentative portfolio is then passed to differentiator module 1038, which optimizes the portfolio by performing gradient ascent to locate a local maximum in average risk-adjusted return. The resulting, optimized portfolio is outputted via an output port 1040 and a communication port 1042.

In an alternative embodiment, some or all of multiplexers 1014 and 1016, processor modules 1018 and 1020, counters 1022 and 1036, comparators 1024 and 1034, correlator 1030, combination module 1028, screening module 1032, and differentiator 1038 may collectively be implemented by appropriately hardwiring one or more gate arrays.

In yet another embodiment, this collection of hardware could be implemented by a programmable logic device ("PLD"), such as the FLEX 8000® PLD manufactured by Altera Corporation, of San Jose, Calif., coupled to an erasable programmable read-only memory ("EPROM"). One advantage to using a PLD-based hardware system would be the ability to dynamically reconfigure the hardware components.

Those skilled in the art will appreciate that the present invention can be practiced by other than the described embodiments, which are presented for the purposes of illustration and not of limitation, and the present invention is limited only by the claims which follow.

What is claimed is:

1. A portfolio selector for selecting, for an investor, an investment portfolio comprising one or more assets from a plurality of assets, each of said assets having market value data observable on a periodic basis, said assets divided into ordered groups ordered from first to last, selection of said investment portfolio being based on asset value data for said plurality of assets, on target value data for a target asset, and on investment preference data for said investor, said portfolio selector comprising:

(a) a first multiplexer, responsive to one or more select line or lines, for sequentially selecting one of said assets from said first group;

(b) a first processor module, for determining an average risk-adjusted return of said asset selected by said first multiplexer, said first processor module comprising:

(i) means for using said asset value data for said asset and said target value data to compute a plurality of nonnegative extents and a plurality of segment performances by computing, for each of a plurality of time segments of equal duration:
a nonnegative extent to which said asset underperforms said target asset over said time segment; and
a segment performance of said asset over said time segment; and (ii) means for computing a function of said nonnegative extents and said segment performances, to yield said average risk-adjusted return;

(c) a first iterator, for iteratively engaging said first multiplexer select line or lines and said first processor module until risk-adjusted returns have been calculated for all of said assets in said first group;

(d) a first comparator, for choosing an asset from said assets in said first group to form a tentative portfolio, based on a comparison of said average risk-adjusted returns of said assets;

(e) a second multiplexer, responsive to one or more select lines, for sequentially selecting a group from among all said groups except said first group, in order of groups from second group to last group;

(f) combination means for forming combinations of said tentative portfolio and an asset in said selected group by computing, for each combination, combination value data based on said asset value data for all assets comprising said combination, said combination value data representing the market value of said combination;

(g) a second processor module for computing, for each combination formed by said combination means, an average combination risk-adjusted return of said combination, said second processor module comprising:

(i) means for using said combination value data for said combination and said target value data to compute a plurality of nonnegative extents and a plurality of segment performances by computing, for each of a plurality of time segments of equal duration;
a nonnegative extent to which said combination underperforms said target asset over said time segment; and
a segment performance of said combination over said time segment; and (ii) means for computing a function of said nonnegative extents and said segment performances, to yield said average combination risk-adjusted return;

(h) a correlator for computing a correlation of variances of said tentative portfolio and said asset in said combination;

(i) a screening module, for determining which of said combinations have correlations that satisfy criteria derived from said investment preference data;

(j) a second comparator, for choosing the combination having the highest average combination risk-adjusted return from among the combinations passed by said screening module, and designating this combination as the tentative portfolio;

(k) a second iterator, for iteratively engaging said second multiplexer select line or lines and said combination means, second processor means, correlator, screening module, and second comparator, until all of said groups have been processed, and then designating said tentative portfolio as said investment portfolio; and (1) communication means, for communicating to said investor said investment portfolio, which, if approved by said investor, results in execution of one or more asset trades.

2. The portfolio selector of claim 1 further comprising communication means for receiving said asset value data or said target value data or both.

3. The portfolio selector of claim 1 further comprising communication means for executing one or more asset trades in a market in which said assets are traded, to form said investment portfolio.

4. The portfolio selector of claim 3 wherein said communication means interrogates said investor, prior to executing said asset trade or trades, as to whether said investor approves said investment portfolio for investment.

5. The portfolio selector of claim 1 further comprising a differentiator, for locally optimizing said risk-adjusted return of said investment portfolio after said iterator designates said investment portfolio.

6. The portfolio selector of claim 1 further comprising an output device selected from the group consisting of a printer, a display terminal, a modem, a mass storage means, and combinations thereof, said output device coupled to said output port.

7. The portfolio selector of claim 1 wherein said second iterator, after processing all of said groups but before designating said tentative portfolio, engages said second multiplexer select line or lines to add to said tentative portfolio an additional asset or assets from one or more of said groups.

8. A portfolio selector for selecting, for an investor, an investment portfolio comprising one or more assets from a plurality of assets, each of said assets having market value data observable on a periodic basis, said assets divided into ordered groups ordered from first to last, selection of said investment portfolio being based on asset value data for said plurality of assets, on target value data for a target asset, and on investment preference data for said investor, said portfolio selector comprising:

(a) a first multiplexer, responsive to one or more select line or lines, for sequentially selecting one of said assets from said first group;

(b) a first processor module, for determining an average risk-adjusted return of said asset selected by said first multiplexer, said first processor module comprising:
  (i) means for using said asset value data for said asset and said target value data to compute a plurality of nonnegative extents and a plurality of segment performances by computing, for each of a plurality of time segments of equal duration:
    a nonnegative extent to which said asset underperforms said target asset over said time segment; and
    a segment performance of said asset over said time segment; and
  (ii) means for computing a function of said nonnegative extents and said segment performances, to yield said average risk-adjusted return;

(c) a first iterator, for iteratively engaging said first multiplexer select line or lines and said first processor module until risk-adjusted returns have been calculated for all of said assets in said first group;

(d) a first comparator, for choosing an asset from said assets in said first group to form a tentative portfolio, based on a comparison of said average risk-adjusted returns of said assets;

(e) a second multiplexer, responsive to one or more select lines, for sequentially selecting a group from among all said groups except said first group, in order of groups from second group to last group;

(f) combination means for forming combinations of said tentative portfolio and an asset in said selected group by computing, for each combination, combination value data based on said asset value data for all assets comprising said combination, said combination value data representing the market value of said combination;

(g) a second processor module for computing, for each combination formed by said combination means, an average combination risk-adjusted return of said combination, said second processor module comprising:
  (i) means for using said combination value data for said combination and said target value data to compute a plurality of nonnegative extents and a plurality of segment performances by computing, for each of a plurality of time segments of equal duration:
    a nonnegative extent to which said combination underperforms said target asset over said time segment; and
    a segment performance of said combination over said time segment; and
  (ii) means for computing a function of said nonnegative extents and said segment performances, to yield said average combination risk-adjusted return;

(h) a correlator for computing a correlation of variances of said tentative portfolio and said asset in said combination;

(i) a screening module, for determining which of said combinations have correlations that satisfy criteria derived from said investment preference data;

(j) a second comparator, for choosing the combination having the highest average combination risk-adjusted return from among the combinations passed by said screening module, and designating this combination as the tentative portfolio;

(k) a second iterator, for iteratively engaging said second multiplexer select line or lines and said combination means, second processor means, correlator, screening module, and second comparator, until all of said groups have been processed, and then designating said tentative portfolio as said investment portfolio;

(l) a differentiator, for locally optimizing said risk-adjusted return of said investment portfolio after said second iterator designates said investment portfolio;

(m) an output port, for outputting said investment portfolio;

(n) first communication means, for receiving said asset value data or said target value data or both; and (o) second communication means, for interrogating said investor as to whether said investor approves said investment portfolio for investment, and then, if said investor approves, executing one or more asset trades in a market in which said assets are traded, to form said investment portfolio.

9. The portfolio selector of claim 8 further comprising an output device selected from the group consisting of a printer, a display terminal, a modem, a mass storage means, and combinations thereof, said output device coupled to said output port.

10. The portfolio selector of claim 8 wherein said second iterator, after processing all of said groups but before designating said tentative portfolio, engages said second multiplexer select line or lines to add to said tentative portfolio an additional asset or assets from one or more of said groups.

11. A portfolio selector for selecting, for an investor, an investment portfolio comprising one or more assets from a plurality of assets, each of said assets having market value data observable on a periodic basis, selection of said investment portfolio being based on asset value data for said plurality of assets, on target value data for a target asset, and on investment preference data for said investor, said portfolio selector comprising:

(a) a multiplexer, responsive to one or more select lines, for selecting an asset, or a set of assets and their relative proportions, from said plurality of assets, to form a tentative investment portfolio;

(b) a processor module, for determining an average relative performance of said tentative portfolio, said processor module comprising:
  (i) means for using said target value data and said asset value data for said assets comprising said tentative portfolio to compute a plurality of nonnegative extents and a plurality of segment performances by computing, for each of a plurality of time segments of equal duration:
    a nonnegative extent to which said tentative portfolio underperforms said target asset over said time segment; and
    a segment performance of said tentative portfolio over said time segment; and
  (ii) means for computing a function of said nonnegative extents and said segment performances to yield said average relative performance;

(c) a tester, for testing whether said tentative portfolio selected by said multiplexer satisfies criteria derived from said investor preference data, based on said average relative performance calculated by said processor module;

(d) an initializer, for initially engaging said multiplexer select line or lines and said processor module;

(e) an iterator, for iteratively engaging said multiplexer select line or lines and said processor module until said tester determines that said tentative portfolio satisfies said criteria and is therefore to be designated as said investment portfolio; and (f) communication means, for communicating to said investor said investment portfolio, which, if approved by said investor, results in execution of one or more asset trades.

12. The portfolio selector of claim 11 further comprising communication means for receiving said asset value data or said target value data or both.

13. The portfolio selector of claim 11 further comprising communication means for executing one or more asset trades in a market in which said assets are traded, to form said investment portfolio.

14. The portfolio selector of claim 13 wherein said communication means interrogates said investor, prior to executing said asset trade or trades, as to whether said investor approves said investment portfolio for investment.

15. The portfolio selector of claim 11 further comprising a differentiator, for locally optimizing said average portfolio risk-adjusted return of said investment portfolio after said tester determines that said tentative portfolio is to be designated as said investment portfolio.

16. The portfolio selector of claim 11 further comprising an output device selected from the group consisting of a printer, a display terminal, a modem, a mass storage means, and combinations thereof, said output device coupled to said output port.

17. A portfolio selector for selecting, for an investor, an investment portfolio comprising one or more assets from a plurality of assets, each of said assets having market value data observable on a periodic basis, selection of said investment portfolio being based on asset value data for said plurality of assets, on target value data for a target asset, and on investment preference data for said investor, said portfolio selector comprising:

(a) a multiplexer, responsive to one or more select lines, for selecting an asset, or a set of assets and their relative proportions, from said plurality of assets, to form a tentative investment portfolio;

(b) a processor module, for determining an average relative performance of said tentative portfolio, said processor module comprising:
  (i) means for using said target value data and said asset value data for said assets comprising said tentative portfolio to compute a plurality of nonnegative extents and a plurality of segment performances by computing, for each of a plurality of time segments of equal duration:
    a nonnegative extent to which said tentative portfolio underperforms said target asset over said time segment; and
    a segment performance of said tentative portfolio over said time segment; and
  (ii) means for computing a function of said nonnegative extents and said segment performances to yield said average relative performance;

(c) a tester, for testing whether said tentative portfolio selected by said multiplexer satisfies criteria derived from said investor preference data, based on said average relative performance calculated by said processor module;

(d) an initializer, for initially engaging said multiplexer select line or lines and said processor module;

(e) an iterator, for iteratively engaging said multiplexer select line or lines and said processor module until said tester determines that said tentative portfolio satisfies said criteria and is therefore to be designated as said investment portfolio;

(f) a differentiator, for locally optimizing said average portfolio risk-adjusted return of said investment portfolio after said tester determines that said tentative portfolio is to be designated as said investment portfolio;

(g) an output port, for outputting said investment portfolio;

(h) first communication means, for receiving said asset value data or said target value data or both; and (i) second communication means, for interrogating said investor as to whether said investor approves said investment portfolio for investment, and then, if said investor approves, executing one or more asset trades in a market in which said assets are traded, to form said investment portfolio.

18. The portfolio selector of claim 17 further comprising an output device selected from the group consisting of a printer, a display terminal, a modem, a mass storage means, and combinations thereof, said output device coupled to said output port.

19. Apparatus for determining an average relative performance of a first asset relative to a second asset and communicating said average relative performance to an investor for execution of one or more asset trades, each of said assets having market value data observable on a periodic basis, said average relative performance based on first value data for said first asset and second value data for said second asset, said apparatus comprising:

(a) input means for receiving:
  (i) said first value data comprising a first plurality of pairs of observations of market value of said first asset, the observations in each pair of observations being spaced apart by a time duration common to all said pairs of observations; and
  (ii) said second value data comprising a corresponding second plurality of pairs of observations of market value of said second asset, the observations in each pair of observations being spaced apart by said time duration;

(b) a processor module, for computing, for each said pair in said first plurality and each said corresponding pair in said second plurality:

(i) a performance of said first asset over said time duration; and (ii) an extent to which said first asset underperforms said second asset over said time duration, which extent when negative is replaced by zero, to yield a nonnegative shortfall;

(c) means for computing a first average of said performances and a second average of said nonnegative shortfalls;

(d) means for computing a difference between said first average and said second average, to yield said average relative performance; and (e) communication means, for communicating to said investor said average relative performance, which, if approved by said investor, results in execution of one or more asset trades.

20. The apparatus of claim 19 wherein said difference between said first average and said second average is weighted.

21. The apparatus of claim 20 wherein said difference is weighted by a loss-to-gain aversion weight that is specific to an investor.

22. The apparatus of claim 21 wherein said aversion weight varies with the magnitudes of said shortfalls.

23. Apparatus for determining an average relative performance of a first asset relative to a second asset and communicating said average relative performance to an investor for execution of one or more asset trades, each of said assets having market value data observable on a periodic basis, said average relative performance based on first value data for said first asset and second value data for said second asset, said apparatus comprising:

(a) means for identifying pairs of said first value data and pairs of said second value data, each said pair of first value data corresponding in time with one of said pairs of second value data, each pair comprising a first datapoint and a second datapoint;

(b) a processor module, for computing, for each said pair of said first value data and each said corresponding pair of said second value data:

(i) a nonnegative extent to which said first asset underperforms said second asset; and (ii) a performance of said first asset equal to a percentage increase in asset value from said first datapoint to said second datapoint;

(c) means for computing a function of said nonnegative extents and said performances, to yield said average relative performance; and (d) communication means, for communicating to said investor said average relative performance, which, if approved by said investor, results in execution of one or more asset trades.

24. The apparatus of claim 23 wherein said datapoints in each of said pairs of value data represent value data that are spaced apart in time by a time duration that is the same for all of said value data pairs.

25. The apparatus of claim 24 wherein said means for computing comprises a means for performing a weighting by a loss-to-gain aversion weight that is specific to an investor.

26. The apparatus of claim 25 wherein said aversion weight varies with the magnitudes of said nonnegative extents.

27. The apparatus of claim 24 further comprising input means for receiving said asset value data or said target value data or both.

28. The apparatus of claim 24 further comprising communication means for making an investment recommendation based on said average relative performance.

29. The apparatus of claim 28 wherein said communication means further comprises means for executing an asset trade in a market in which said first asset is traded, said trade based on said average relative performance.

30. Apparatus for determining an average relative performance of a first asset relative to a second asset, each of said assets having market value data observable on a periodic basis, said average relative performance based on first value data for said first asset and second value data for said second asset, said apparatus comprising:

(a) input means for receiving said asset value data or said target value data or both;

(b) means for identifying pairs of said first value data and pairs of said second value data, each said pair of first value data corresponding in time with one of said pairs of second value data, each pair comprising a first datapoint and a second datapoint, said datapoints in each of said pairs of value data representing value data that are spaced apart in time by a time duration that is the same for all of said value data pairs;

(c) a processor module, for computing, for each said pair of said first value data and each said corresponding pair of said second value data:

(i) a nonnegative extent to which said first asset underperforms said second asset; and (ii) a performance of said first asset equal to a percentage increase in asset value from said first datapoint to said second datapoint;

(d) means for computing a function of said nonnegative extents, of said performances, and of a loss-to-gain aversion weight that is specific to an investor, to yield said average relative performance; and (e) communication means for:

(i) making an investment recommendation based on said average relative performance; and (ii) executing an asset trade in a market in which said first asset is traded, said trade based on said average relative performance.

31. Apparatus for determining shortfall in performance of a first asset relative to a second asset, each of said assets halving market value data observable on a periodic basis, said shortfall based on first value data for said first asset and second value data for said second asset, said apparatus comprising:

(a) means for identifying pairs of first value data and corresponding pairs of second value data, each pair spanning a time period, said time period spanned by each pair of first value data overlapping with said time period spanned by at least one other pair of first value data, and said time period spanned by each pair of second value data overlapping with said time period spanned by at least one other pair of second value data, each pair comprising a first datapoint and a second datapoint;

(b) a processor module, for computing, for each said pair of first value data and each said corresponding pair of second value data, a nonnegative extent to which said first asset underperforms said second asset;

(c) means for averaging said nonnegative extents to yield said shortfall; and.

32. The apparatus of claim 31 wherein said datapoints in each of said pairs of value data represent value data that are spaced apart in time by a time duration that is the same for all of said value data pairs.

33. A method for selecting, for an investor, an investment portfolio comprising one or more assets from a plurality of assets, each of said assets having market value data observable on a periodic basis, said assets divided into ordered groups ordered from first to last, selection of said investment portfolio being based on asset value data for said plurality of assets, on target value data for a target asset, and on investment preference data for said investor, said method comprising the steps of:

(a) computing average risk-adjusted returns of said assets in said first group by performing the following steps for each of said assets:
  (i) using said asset value data for said asset and said target value data to compute a plurality of nonnegative extents and a plurality of segment performances by computing, a for each of a plurality of time segments of equal duration:
    a nonnegative extent to which said asset underperforms said target asset over said time segment; and
    a segment performance of said asset over said time segment; and
  (ii) determining said average risk-adjusted return by computing a function of said nonnegative extents and said segment performances;
(b) choosing an asset from said assets in said first group to form a tentative portfolio, based on a comparison of said average risk-adjusted returns of said assets;
(c) completing the following steps for each of the remaining groups in order of groups from second group to last group, until said tentative portfolio contains one asset from each of said groups:
  (i) forming combinations of said tentative portfolio and an asset in said group;
  (ii) for each combination, computing
    (A) combination value data based on said asset value data for all assets comprising said combination, said combination value data representing the market value of said combination;
    (B) an average combination risk-adjusted return of said combination, by performing the following steps:
      using said combination value data and said target value data to compute a plurality of nonnegative extents and a plurality of segment performances by computing, for each of a plurality of time segments of equal duration:
        a nonnegative extent to which said combination underperforms said target asset over said time segment; and
        a segment performance of said combination over said time segment; and
      determining said average combination risk-adjusted return by computing a function of said nonnegative extents and said segment performances; and
    (C) a correlation of variances of said tentative portfolio and said asset in said combination; and
  (iii) choosing the combination having the highest average combination risk-adjusted return from among the combinations whose correlations satisfy criteria derived from said investment preference data, and designating this combination as the tentative portfolio;
(d) determining optimal relative weights for the assets comprising said tentative portfolio by calculating an average portfolio risk-adjusted return of said tentative portfolio and locally optimizing said average portfolio risk-adjusted return, to yield said investment portfolio; and
(e) communicating to said investor said investment portfolio, which, if approved by said investor, results in execution of one or more asset trades.

34. The method of claim 33 further comprising the step of executing one or more asset trades in a market in which said assets are traded, to form said investment portfolio.

35. The method of claim 34 further comprising the step of interrogating said investor, prior to executing said asset trade or trades, as to whether said investor approves said investment portfolio for investment.

36. A method for selecting, for an investor, an investment portfolio comprising one or more assets from a plurality of assets, each of said assets having market value data observable on a periodic basis, said assets divided into ordered groups ordered from first to last, selection of said investment portfolio being based on asset value data for said plurality of assets, on target value data for a target asset, and on investment preference data for said investor, said method comprising the steps of:

(a) computing average risk-adjusted returns of said assets in said first group by performing the following steps for each of said assets:
  (i) using said asset value data for said asset and said target value data to compute a plurality of nonnegative extents and a plurality of segment performances by computing, for each of a plurality of time segments of equal duration:
    a nonnegative extent to which said asset underperforms said target asset over said time segment; and
    a segment performance of said asset over said time segment; and
  (ii) determining said average risk-adjusted return by computing a function of said nonnegative extents and said segment performances;
(b) choosing an asset from said assets in said first group to form a tentative portfolio, based on a comparison of said average risk-adjusted returns of said assets;
(c) completing the following steps for each of the remaining groups in order of groups from second group to last group, until said tentative portfolio contains one asset from each of said groups:
  (i) forming combinations of said tentative portfolio and an asset in said group;
  (ii) for each combination, computing
    (A) combination value data based on said asset value data for all assets comprising said combination, said combination value data representing the market value of said combination;
    (B) an average combination risk-adjusted return of said combination, by performing the following steps:
      using said combination value data and said target value data to compute a plurality of nonnegative extents and a plurality of segment performances by computing, for each of a plurality of time segments of equal duration:
        a nonnegative extent to which said combination under performs said target asset over said time segment; and
        a segment performance of said combination over said time segment; and
      determining said average combination risk-adjusted return by computing a function of said nonnegative extents and said segment performances; and
    (C) a correlation of variances of said tentative portfolio and said asset in said combination; and
  (iii) choosing the combination having the highest average combination risk-adjusted return from among the combinations whose correlations satisfy criteria derived from said investment preference data, and designating this combination as the tentative portfolio;

(d) determining optimal relative weights for the assets comprising said tentative portfolio by calculating an average portfolio risk-adjusted return of said tentative portfolio and locally optimizing said average portfolio risk-adjusted return, to yield said investment portfolio; and (e) interrogating said investor as to whether said investor approves said investment portfolio for investment, and then, if said investor approves, executing one or more asset trades in a market in which said assets are traded, to form said investment portfolio.

37. A method for selecting, for an investor, an investment portfolio comprising one or more assets from a plurality of assets, each of said assets having market value data observable on a periodic basis, selection of said investment portfolio being based on asset value data for said plurality of assets, on target value data for a target asset, and on investment preference data for said investor, said method comprising the steps of:

(a) selecting an asset, or a set of assets and their relative proportions, from said plurality of assets, to form a tentative investment portfolio;

(b) computing an average relative performance of said tentative portfolio, by:

(i) using said target value data and said asset value data for said assets comprising said tentative portfolio to compute a plurality of nonnegative extents and a plurality of segment performances by computing, for each of a plurality of time segments of equal duration:

a nonnegative extent to which said tentative portfolio underperforms said target asset over said time segment; and a segment performance of said tentative portfolio over said time segment; and (ii) determining said average relative performance by computing a function of said nonnegative extents and said segment performances; and (c) repeating steps (a) and (b) iteratively until said average relative performance satisfies criteria derived from said investment preference data, designating said tentative portfolio as said investment portfolio when the criteria are satisfied, and communicating to said investor said investment portfolio, which, if approved by said investor, results in execution of one or more asset trades.

38. The method of claim 37 further comprising the step of executing one or more asset trades in a market in which said assets are traded, to form said investment portfolio.

39. The method of claim 38 further comprising the step of interrogating said investor, prior to executing said asset trade or trades, as to whether said investor approves said investment portfolio for investment.

40. The method of claim 37 further comprising the step of locally optimizing said average portfolio risk-adjusted return of said investment portfolio after designating said tentative portfolio as said investment portfolio.

41. The method of claim 37 wherein each of steps (a), (b), and (c) is performed at least twice to yield a set of investment portfolios.

42. A method for selecting, for an investor, an investment portfolio comprising one or more assets from a plurality of assets, each of said assets having market value data observable on a periodic basis, selection of said investment portfolio being based on asset value data for said plurality of assets, on target value data for a target asset, and on investment preference data for said investor, said method comprising the steps of:

(a) selecting an asset, or a set of assets and their relative proportions, from said plurality of assets, to form a tentative investment portfolio;

(b) computing an average relative performance of said tentative portfolio, by:

(i) using said target value data and said asset value data for said assets comprising said tentative portfolio to compute a plurality of nonnegative extents and a plurality of segment performances by computing, for each of a plurality of time segments of equal duration:

a nonnegative extent to which said tentative portfolio underperforms said target asset over said time segment; and a segment performance of said tentative portfolio over said time segment; and (ii) determining said average relative performance by computing a function of said nonnegative extents and said segment performances;

(c) repeating steps (a) and (b) iteratively until said average relative performance satisfies criteria derived from said investment preference data, designating said tentative portfolio as said investment portfolio when said criteria are satisfied, and communicating said designation to said investor;

(d) performing each of steps (a), (b), and (c) at least twice to yield a set of investment portfolios;

(e) locally optimizing each of said average portfolio risk-adjusted returns of said set of investment portfolios, after designating said set of investment portfolios, to yield a set of optimized investment portfolios; and (f) interrogating said investor as to whether said investor approves any of said optimized investment portfolios for investment, and then, if said investor approves any, executing one or more asset trades in a market in which said assets are traded, to form the investment portfolio or portfolios that were approved by said investor.

43. A method for determining an average relative performance of a first asset relative to a second asset and communicating said average relative performance to an investor for execution of one or more asset trades, each of said assets having market value data observable on a periodic basis, said average relative performance based on first value data for said first asset and second value data for said second asset, said method comprising the steps of:

(a) providing said first value data comprising a first plurality of pairs of observations of market value of said first asset, the observations in each pair of observations being spaced apart by a time duration common to all said pairs of observations;

(b) providing said second value data comprising a corresponding second plurality of pairs of observations of market value of said second asset, the observations in each pair of observations being spaced apart by said time duration;

(c) determining, for each pair in said first plurality and a corresponding pair in said second plurality:

(i) a performance of said first asset over said time duration;

(ii) an extent to which said first asset underperforms said second asset over said time duration, which extent when negative is replaced by zero, to yield a nonnegative shortfall;

(d) computing a first average of said performances;

(e) computing a second average of said nonnegative shortfalls;

(f) computing said average relative performance by computing a difference between said first average and said second average; and (g) communicating to said investor said average relative performance, which, if approved by said investor, results in execution of one or more asset trades.

44. The method of claim 43 wherein said difference between said first average and said second average is weighted.

45. The method of claim 44 wherein said difference is weighted by a loss-to-gain aversion weight that is specific to an investor.

46. The method of claim 45 wherein said aversion weight varies with the magnitudes of said shortfalls.

47. A method for determining an average relative performance of a first asset relative to a second asset and communicating said average relative performance to an investor for execution of one or more asset trades, each of said assets having market value data observable on a periodic basis, said average relative performance based on first value data for said first asset and second value data for said second asset, said method comprising the steps of:

(a) identifying pairs of first value data and pairs of second value data, each said pair of first value data corresponding in time with one of said pairs of second value data, each pair comprising a first datapoint and a second datapoint;

(b) for each pair of first value data and each corresponding pair of second value data:

(i) computing a nonnegative extent to which said first asset underperforms said second asset; and (ii) computing a performance of said first asset equal to a percentage increase in asset value from said first datapoint to said second datapoint;

(c) determining said average relative performance by computing a function of said nonnegative extents and said performances; and (d) communicating to said investor said average relative performance, which, if approved by said investor, results in execution of one or more asset trades.

48. The method of claim 47 wherein said datapoints in each of said pairs of value data represent value data that are spaced apart in time by a time duration that is the same for all of said value data pairs.

49. The method of claim 48 wherein computing a function of said nonnegative extents and said performances includes performing a weighting by a loss-to-gain aversion weight that is specific to an investor.

50. The method of claim 49 wherein said aversion weight varies with the magnitudes of said nonnegative extents.

51. The method of claim 48 further comprising the step of making an investment recommendation based on said average relative performance.

52. The method of claim 48 further comprising the step of executing an asset trade in a market in which said first asset is traded, said trade based on said average relative performance.

53. A method for determining an average relative performance of a first asset relative to a second asset, each of said assets having market value data observable on a periodic basis, said average relative performance based on first value data for said first asset and second value data for said second asset, said method comprising the steps of:

(a) identifying pairs of first value data and pairs of second value data, each said pair of first value data corresponding in time with one of said pairs of second value data, each pair comprising a first datapoint and a second datapoint, said datapoints in each of said pairs of value data representing value data that are spaced apart in time by a time duration that is the same for all of said value data pairs;

(b) for each pair of first value data and each corresponding pair of second value data:

(i) computing a nonnegative extent to which said first asset underperforms said second asset; and (ii) computing a performance of said first asset equal to a percentage increase in asset value from said first datapoint to said second datapoint;

(c) determining said average relative performance by computing a function of said nonnegative extents, of said performances, and of a loss-to-gain aversion weight that is specific to an investor;

(d) making an investment recommendation based on said average relative performance; and (e) if said investor approves of said recommendation, executing an asset trade in a market in which said first asset is traded, said trade based on said average relative performance.

54. A method for determining shortfall in performance of a first asset relative to a second asset and communicating said shortfall to an investor for execution of one or more asset trades, each of said assets having market value data observable on a periodic basis, said shortfall based on first value data for said first asset and second value data for said second asset, said method comprising the steps of:

(a) identifying pairs of first value data and corresponding pairs of second value data, each pair spanning a time period, said time period spanned by each pair of first value data overlapping with said time period spanned by at least one other pair of first value data, and said time period spanned by each pair of second valve data overlapping with said time period spanned by at least one other pair of second value data, each pair comprising a first datapoint whose value represents the market value of said first or second asset on an earlier date and a second datapoint whose value represents the market value of said first or second asset on a later date;

(b) for each pair of first value data and each pair of corresponding second value data, computing a nonnegative extent to which said first asset underperforms said second asset, to yield a plurality of nonnegative extents;

(c) averaging said nonnegative extents to yield said shortfall; and (d) communicating to said investor said shortfall, which, if approved by said investor, results in execution of one or more asset trades. (d) means for communicating to said investor said shortfall, which, if approved by said investor, results in execution of one or more asset trades.

55. The method of claim 54 wherein said datapoints in each of said pairs of value data represent value data that are spaced apart in time by a time duration that is the same for all of said value data pairs.

* * * * *